United States Patent
Fan et al.

(10) Patent No.: US 9,905,836 B2
(45) Date of Patent: Feb. 27, 2018

(54) RECHARGABLE BATTERY WITH INTERNAL CURRENT LIMITER AND INTERRUPTER

(71) Applicant: American Lithium Energy Corporation, Vista, CA (US)

(72) Inventors: Jiang Fan, San Diego, CA (US); Dengguo Wu, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 0 days.

(21) Appl. No.: 15/055,576

(22) Filed: Feb. 27, 2016

(65) Prior Publication Data

US 2016/0181590 A1   Jun. 23, 2016

Related U.S. Application Data

(63) Continuation of application No. 14/714,160, filed on May 15, 2015.

(Continued)

(51) Int. Cl.
*H01M 14/00* (2006.01)
*H01M 2/34* (2006.01)
(Continued)

(52) U.S. Cl.
CPC ............ *H01M 2/345* (2013.01); *H01M 2/34* (2013.01); *H01M 2/348* (2013.01); *H01M 10/425* (2013.01); *H01M 10/4235* (2013.01); *H01M 10/052* (2013.01); *H01M 2010/4271* (2013.01); *H01M 2200/10* (2013.01); *H01M 2200/20* (2013.01)

(58) Field of Classification Search
CPC ........ H01M 2/345; H01M 2/34; H01M 2/348; H01M 10/4235; H01M 10/425; H01M 10/052; H01M 2010/4271; H01M 2200/10; H01M 2200/20
See application file for complete search history.

(56) References Cited

U.S. PATENT DOCUMENTS

| | | |
|---|---|---|
| 4,075,400 A | 2/1978 | Fritts |
| 5,504,128 A | 4/1996 | Mizutani et al. |

(Continued)

FOREIGN PATENT DOCUMENTS

| | | |
|---|---|---|
| EP | 0450549 A1 | 10/1991 |
| EP | 0776058 A2 | 5/1997 |

(Continued)

OTHER PUBLICATIONS

Eichstadt, Amy E., et al. "Structure-Property Relationships for a Series of Amorphous Partially Aliphatic Polyimides." *Journal of Polymer Science Part B: Polymer Physics* 40.14 (2002): 1503-1512.

(Continued)

*Primary Examiner* — Raymond Alejandro
(74) *Attorney, Agent, or Firm* — Mintz Levin Cohn Ferris Glovsky and Popeo, P.C.

(57) ABSTRACT

A high energy density rechargeable (HEDR) battery employs a combined current limiter/current interrupter to prevent thermal runaway in the event of internal discharge or other disruption of the separator. The combined current limiter/current interrupter is interior to the battery.

17 Claims, 24 Drawing Sheets

Related U.S. Application Data

(60) Provisional application No. 62/084,454, filed on Nov. 25, 2014, provisional application No. 62/114,508, filed on Feb. 10, 2015.

(51) Int. Cl.
*H01M 10/42* (2006.01)
*H01M 10/052* (2010.01)

(56) References Cited

U.S. PATENT DOCUMENTS

| | | | |
|---|---|---|---|
| 6,387,570 B1 | 5/2002 | Nakamura et al. | |
| 6,780,544 B2 | 8/2004 | Noh | |
| 8,021,788 B2 | 9/2011 | Kim et al. | |
| 2005/0079422 A1 | 4/2005 | Ko et al. | |
| 2006/0099506 A1 | 5/2006 | Krause et al. | |
| 2007/0166609 A1 | 7/2007 | Lee et al. | |
| 2007/0269718 A1 | 11/2007 | Krause et al. | |
| 2008/0116423 A1 | 5/2008 | Fan et al. | |
| 2008/0241684 A1 | 10/2008 | Muraoka et al. | |
| 2008/0254343 A1* | 10/2008 | Kaplin | H01M 2/1223 429/53 |
| 2010/0167107 A1* | 7/2010 | Byun | H01M 2/1229 429/56 |
| 2011/0045321 A1* | 2/2011 | Park | H01M 2/0404 429/7 |
| 2012/0056709 A1 | 3/2012 | Kajino et al. | |
| 2012/0068127 A1 | 3/2012 | Kawase et al. | |
| 2013/0101869 A1* | 4/2013 | Farmer | H01M 10/42 429/7 |
| 2013/0130075 A1 | 5/2013 | Kim et al. | |

FOREIGN PATENT DOCUMENTS

| | | |
|---|---|---|
| EP | 1246280 A2 | 10/2002 |
| JP | 7220755 A2 | 8/1995 |
| JP | H09 320568 A | 12/1997 |
| KR | 20130123492 A | 11/2013 |
| WO | WO-2004/049494 A1 | 6/2004 |

OTHER PUBLICATIONS

Fang, Xingzhong, et al. "Synthesis and properties of polyimides derived from *cis* -and *trans*-1, 2, 3, 4-cyclohexanetetracarboxylic dianhydrides." *Polymer* 45.8 (2004): 2539-2549.

International Search Report and Written Opinion issued in International Application No. PCT/2015/062767, mailed Feb. 12, 2016.

Jeon, Jong-Young, and Tae-Moon Tak. "Synthesis of Aliphatic-Aromatic Polyimides by Two-Step Polymerization of Aliphatic Dianhydride and Aromatic Diamine." *Journal of Applied Polymer Science* 60.11 (1996): 1921-1926.

Loncrini, D. F., and J. M. Witzel. "Polyaryleneimides of meso-and dl-1, 2, 3, 4-Butanetetracarboxylic Acid Dianhydrides." *Journal of Polymer Science Part A 1: Polymer Chemistry* 7.8 (1969): 2185-2193.

Matsumoto, Toshihiko. "Aliphatic polyimides derived from polyalicyclic monomers." *High Performance Polymers* 13.2 (2001): S85-S92.

Schab-Balcerzak, E., et al. "Synthesis and characterization of organosoluble aliphatic-aromatic copolyimides based on cycloaliphatic dianhydride." *European Polymer Journal* 38.3 (2002): 423-430.

Seino, Hiroshi, Amane Mochizuki, and Mitsuru Ueda. "Synthesis of Aliphatic Polyimides Containing Adamantyl Units." *Journal of Polymer Science Part A Polymer Chemistry* 37.18 (1999): 3584-3590.

Seino, Hiroshi, et al. "Synthesis of fully aliphatic polyimides." *High Performance Polymers* 11.3 (1999): 255-262.

Spotnitz, R., and J. Franklin. "Abuse behavior of high-power, lithium-ion cells." *Journal of Power Sources* 113.1 (2003): 81-100.

\* cited by examiner

Prior Art - Unshorted

Prior Art - Shorted

Unshorted

Shorted

Prior Art - Unshorted

Prior Art - Shorted

Unshorted

Shorted

Prior Art - Unshorted

Prior Art - Shorted

Unshorted

Shorted

Prior Art - Unshorted

Prior Art - Shorted

Unshorted

Shorted

Prior Art - Unshorted

Prior Art - Shorted

Unshorted

Shorted

Prior Art - Unshorted

Prior Art - Shorted

Unshorted

Shorted

Prior Art - Unshorted

Prior Art - Shorted

Unshorted

Shorted

Prior Art - Unshorted

Prior Art - Shorted

Unshorted

Shorted

| Cell # | Positive Electrode | Negative Electrode | Comments |
|---|---|---|---|
| 1 | POS1A:<br>$LiNi_{0.5}Mn_{0.3}Co_{0.2}O_2$: 93.4%;<br>Carbon black: 3%;<br>PVDF: 3.6%;<br>Loading: 15.55 mg/cm$^2$;<br>Thickness: 117 µm. | NEG1A:<br>SLP 30: 18.272%;<br>MCMB: 75.728%;<br>Carbon black: 2%;<br>CMC: 1.5%;<br>SBR: 2.5%;<br>Loading: 9.14 mg/cm$^2$;<br>Thickness: 117 µm. | Baseline; no protection layer |
| 2 | POS2A:<br>$Li_{1+x}Ni_{0.33}Co_{0.33}Mn_{0.33}O_2$: 95.3%<br>Carbon black: 1.5%;<br>PVDF: 3%;<br>Dispersing agent: 0.2%;<br>Loading: 15.92 mg/cm$^2$;<br>Thickness: 123 µm. | NEG2A:<br>SLP 30: 18.872%;<br>MCMB: 75.728%;<br>Carbon black: 2%;<br>CMC: 1.3%;<br>SBR: 2.1%;<br>Loading: 8.54 mg/cm$^2$;<br>Thickness: 118 µm. | Baseline; no protection layer; resistance measurement for positive POS2A at 3.6V vs graphite |
| 3 | POS3B: 1$^{st}$ layer<br>$CaCO_3$: 85.2%;<br>Carbon black: 0.8%;<br>TF-4000: 2%;<br>PVDF: 12%;<br>1$^{st}$ Layer Loading: 1 mg/cm$^2$;<br>1$^{st}$ Layer Thickness: ~10 µm.<br><br>POS3A: 2$^{nd}$ layer<br>$LiNi_{0.33}Mn_{0.33}Co_{0.33}O_2$ 93.4%;<br>Carbon black: 3%;<br>PVDF: 3.6%.<br><br>Total electrode (two layers):<br>Loading: 19.4 mg/cm$^2$;<br>Thickness: ~148 µm. | NEG3A:<br>SLP 30: 18.872%;<br>MCMB: 75.728%;<br>Carbon black: 2%;<br>CMC: 1.3%;<br>SBR: 2.1%;<br>Loading: 11.8 mg/cm$^2$;<br>Thickness: 159 µm. | Gas generating layer coated on positive electrode. |
| 4 | POS4B: 1$^{st}$ layer<br>$Al_2O_3$: 42.6%;<br>$CaCO_3$: 42.6%;<br>Carbon black: 0.8%;<br>TF-4000: 2%;<br>PVDF: 12%;<br>1$^{st}$ Layer Loading: 1 mg/cm$^2$;<br>1$^{st}$ Layer Thickness: 10 µm.<br><br>POS4A: 2$^{nd}$ layer<br>$LiNi_{0.5}Mn_{0.3}Co_{0.2}O_2$: 93.4%;<br>Carbon black: 3%;<br>PVDF: 3.6%.<br><br>Total electrode (two layers):<br>Loading: 19.4 mg/cm$^2$;<br>Thickness: ~153 µm. | NEG4A:<br>SLP 30: 18.872%;<br>MCMB: 75.728%;<br>Carbon black: 2%;<br>CMC: 1.3%;<br>SBR: 2.1%;<br>Loading: 11.8 mg/cm$^2$;<br>Thickness: 159 µm. | Resistance and gas generating layer coated on positive electrode. |

FIG. 13A

| 5 | POS5B: 1st layer<br>$Al_2O_3$: 42.6%;<br>$Na_2O_7Si_3$: 42.6%;<br>Carbon black: 0.8%;<br>TF-4000: 2%;<br>PVDF: 12%;<br>1st Layer Loading: 0.7 mg/cm²;<br>1st Layer Thickness: 10 μm.<br><br>POS5A: 2nd layer<br>$LiNi_{0.33}Mn_{0.33}Co_{0.33}O_2$: 95%;<br>Carbon black: 1.5%;<br>PVDF: 3.5%;<br><br>Total electrode (two layers):<br>Loading: 19.5 mg/cm²;<br>Thickness: ~150 μm. | NEG5A:<br>SLP 30: 18.872%;<br>MCMB: 75.728%;<br>Carbon black: 2%;<br>CMC: 1.3%;<br>SBR: 2.1%;<br><br>Loading: 11.8 mg/cm²;<br>Thickness: 159 μm. | Resistance and gas generating layer coated on positive electrode. ($Na_2O_7Si_3$ will absorb the water during the processing in the air and decompose into quartz, sodium disilicate, and liquid) |
| 6 | POS6B: 1st layer<br>$CaCO_3$: 49.8%;<br>Carbon black: 3.7%;<br>PVDF: 46.5%;<br>1st Layer Loading: 1 mg/cm²;<br>1st Layer Thickness: ~10 μm.<br><br>POS6A: 2nd layer<br>$LiNi_{0.33}Mn_{0.33}Co_{0.33}O_2$: 93%;<br>Carbon black: 3%;<br>PVDF: 4%.<br><br>Total electrode (two layers):<br>Loading: 22 mg/cm²;<br>Thickness: ~167 μm. | NEG6A:<br>MCMB: 94%;<br>Carbon black: 2%;<br>CMC: 1.5%;<br>SBR: 2.5%;<br><br>Loading: 12 mg/cm²;<br>Thickness: 170 μm. | Gas generating layer coated on positive electrode. |

Fig. 13B

| Electrode ID | Materials | (%) | (g) | Comments |
|---|---|---|---|---|
| POS7B | Carbopol®-934 | 98.2 | 19.64 | Polymer with $CO_3^{2-}$ anion. |
| | Super-P® | 0.8 | 0.16 | |
| | LiOH | 1 | 0.2 | |
| POS8B | AI-50 | 99.2 | 19.84 | Polymer containing carbonyl group and $NH_2$ group which may decompose into $CO_2$. |
| | Super-P® | 0.8 | 0.16 | |
| POS9B | CMC-DN-800H | 99.2 | 19.84 | Polymer containing carboxylic acid groups with $NH_4$ cations |
| | Super-P® | 0.8 | 0.16 | |
| POS10B | $ZnCO_3 \cdot Zn(OH)_2$ | 85.2 | 17.04 | Salt |
| | Super-P® | 0.8 | 0.16 | |
| | Torlon® 4000TF | 2 | 0.4 | |
| | PVDF-A | 12 | 2.4 | |
| POS11B | $Na_2SO_3$ | 85.2 | 17.04 | Salt |
| | Super-P® | 0.8 | 0.16 | |
| | Torlon® 4000TF | 2 | 0.4 | |
| | PVDF-A | 12 | 2.4 | |
| POS12B | $CuCO_3 \cdot Cu(OH)_2$ | 85.2 | 17.04 | Salt |
| | Super-P® | 0.8 | 0.16 | |
| | Torlon® 4000TF | 2 | 0.4 | |
| | PVDF-A | 12 | 2.4 | |
| POS13B | $La_2(CO_3)_3$ | 85.2 | 17.04 | Salt |
| | Super-P® | 0.8 | 0.16 | |
| | Torlon® 4000TF | 2 | 0.4 | |
| | PVDF-A | 12 | 2.4 | |
| POS14B | $Cu(NO_3)_2$ | 85.2 | 17.04 | Salt |
| | Super-P® | 0.8 | 0.16 | |
| | Torlon® 4000TF | 12 | 2.4 | |
| | PVDF-A | 0.1 | 0.02 | |

Fig. 14

| Cell # | Impedance (mohm) | Cap. at 1A (Ah) | Cap. at 3A (Ah) | Cap. at 6A (Ah) | Cap. at 10A (Ah) | Ratio (Cap. at 1A/Cap. At 3A) | Ratio (Cap. at 1A/Cap. at 6A) | Ratio (Cap. at 1A/Cap. at 10A) |
|---|---|---|---|---|---|---|---|---|
| 1 | 14 | 2.32 | 2.24 | 2.13 | 1.93 | 0.97 | 0.95 | 0.91 |
| 3 | 51.6 | 2.3687 | 2.104 | 1.64 | 0.94 | 0.89 | 0.78 | 0.57 |
| 4 | 46.8 | 2.3809 | 2.2607 | 1.8414 | 1.0256 | 0.95 | 0.81 | 0.56 |
| 5 | 16.5 | 2.4168 | 2.3792 | 2.3 | 2.06 | 0.98 | 0.97 | 0.9 |
| 6 | 15.8 | 2.3383 | 2.2495 | 2.1446 | 1.967 | 0.96 | 0.95 | 0.92 |

| Cell # | Maximum Cell Temperature/°C | Comments |
|---|---|---|
| 1 | 334 | fire and explosion |
| 3 | 80 | pass |
| 4 | 84 | pass |
| 5 | 90 | pass |
| 6 | 84 | pass |

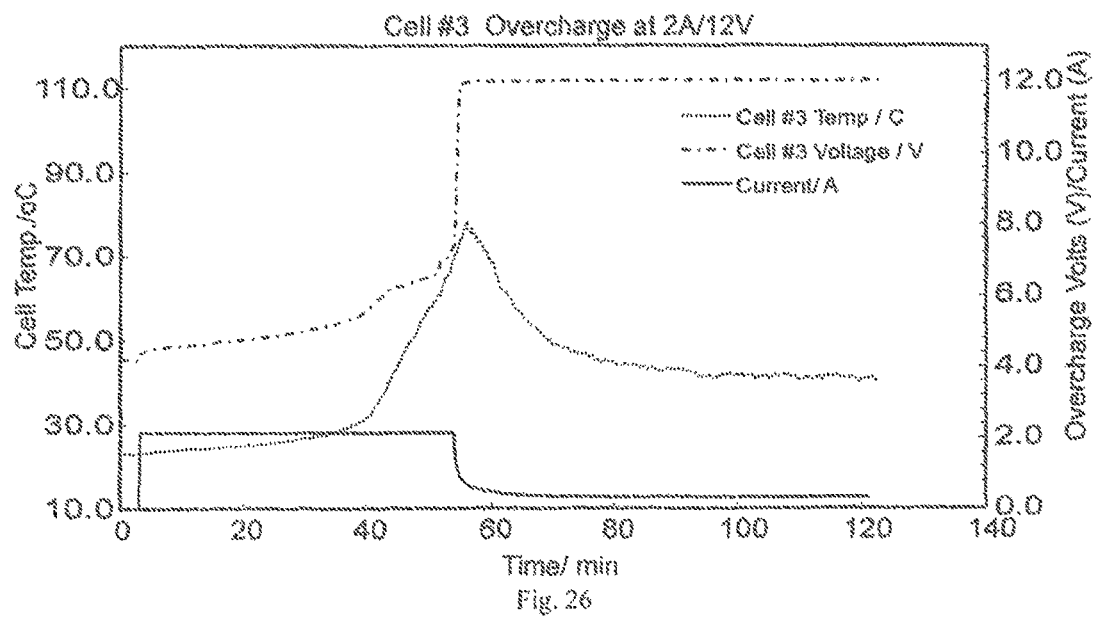
Fig. 26
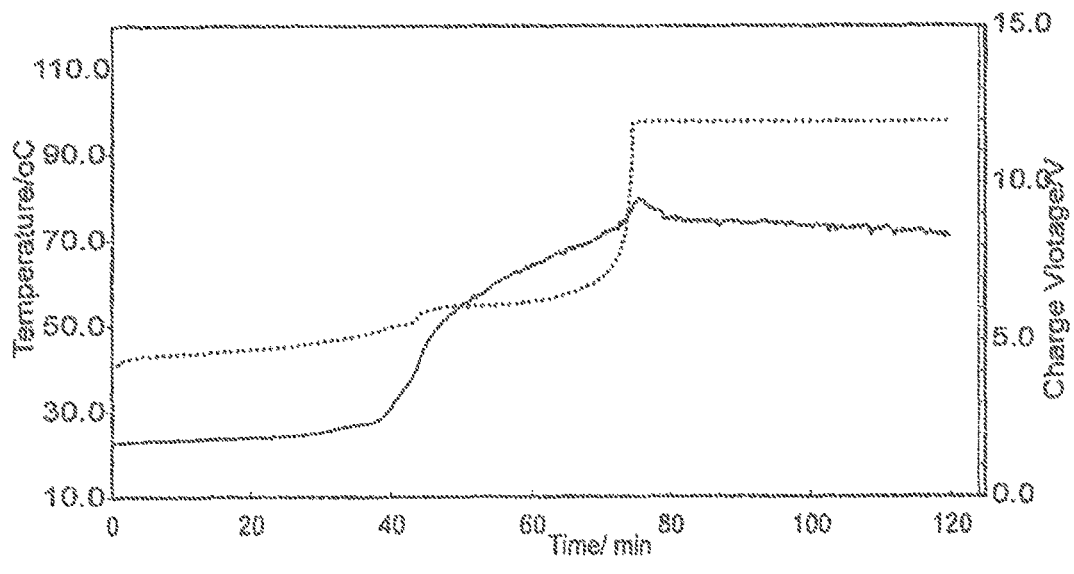
Fig. 27
| Cell # | Maximum Cell Temperature/°C | Comments |
|---|---|---|
| 1 | 680 | fire and explosion |
| 3 | 80 | pass |
| 4 | 80 | pass |
| 5 | 75 | pass |
| 6 | 80 | pass |
Fig. 28

| Polymers | Peak current/mA | Peak voltage/V |
|---|---|---|
| Carbopol | 0.94 | 4.95 |
| Al-50 | 0.96 | 5.88 |
| CMC | 0.4 | >6 |
| PVDF | 1.178 | 5.38 |

RECHARGABLE BATTERY WITH INTERNAL CURRENT LIMITER AND INTERRUPTER

RELATED APPLICATION

This application is a continuation under 35 U.S.C. § 120 of patent application Ser. No. 14/714,160 filed on May 15, 2015, which claims priority under 35 U.S.C. § 119(e) to U.S. provisional application No. 62/084,454 filed Nov. 25, 2014 and also to U.S. provisional application No. 62/114,508 filed Feb. 10, 2015, the disclosures of which are incorporated herein by reference in their entireties.

BACKGROUND

Technical Field

There is a need for rechargeable battery systems with enhanced safety which have a high energy density and hence are capable of storing and delivering large amounts of electrical energy per unit volume and/or weight. Such stable high energy battery systems have significant utility in a number of applications including military equipment, communication equipment, and robotics.

Background

There is a need for rechargeable battery systems with enhanced safety which have a high energy density and hence are capable of storing and delivering large amounts of electrical energy per unit volume and/or weight. Such stable high energy battery systems have significant utility in a number of applications including military equipment, communication equipment, and robotics.

An example of a high energy density rechargeable (HEDR) battery commonly in use is the lithium-ion battery. A lithium-ion battery is a rechargeable battery wherein lithium ions move from the negative electrode to the positive electrode during discharge and back when charging. Lithium-ion batteries can be dangerous under some conditions and can pose a safety hazard. The fire energy content (electrical+chemical) of lithium cobalt-oxide cells is about 100 to 150 kJ per A-h, most of it chemical. If overcharged or overheated, Li-ion batteries may suffer thermal runaway and cell rupture. In extreme cases this can lead to combustion. Also, short-circuiting the battery, either externally or internally, will cause the battery to overheat and possibly to catch fire.

Overcharge:

In a lithium-ion battery, useful work is performed when electrons flow through a closed external circuit. However, in order to maintain charge neutrality, for each electron that flows through the external circuit, there must be a corresponding lithium ion that is transported from one electrode to the other. The electric potential driving this transport is achieved by oxidizing a transition metal. For example, cobalt (Co), from $Co^{3+}$ to $Co^{4+}$ during charge and reduced from $Co^{4+}$ to $Co^{3+}$ during discharge. Conventionally, $Li1-\chi CoO_2$ may be employed, where the coefficient $\chi$ represents the molar fraction of both the Li ion and the oxidative state of $CoO_2$, viz., $Co^{3+}$ or $Co^{4+}$. Employing these conventions, the positive electrode half-reaction for the lithium cobalt battery is represented as follows:

$LiCoO_2 \leftrightharpoons Li_{1-\chi}CoO_2 + \chi Li^+ + \chi e-$

The negative electrode half reaction is represented as follows:

$\chi Li^+ + \chi e- + \chi C_6 \leftrightharpoons \chi LiC_6$

The cobalt electrode reaction is reversible limited to x<0.5, limiting the depth of discharge allowable because of cycle life considerations and the stability of $LiCoO_2$. Overcharge leads to the synthesis of cobalt (IV) oxide, as follows:

$LiCoO_2 \rightarrow Li^+ + CoO_2 + O_2 + e^-$ $LiCoO_2$ will decompose into $CoO_2$ and release a large amount of heat and oxygen. The released oxygen will then oxidize the electrolyte, which will lead to thermal runaway. This process is irreversible. Therefore, what is needed is some device or design that can decompose below or before positive decomposition. This device will protect the cell from thermal runaway.

Thermal Runaway:

If the heat generated by a lithium ion battery exceeds its heat dissipation capacity, the battery can become susceptible to thermal runaway, resulting in overheating and, under some circumstances, to destructive results such as fire or violent explosion. Thermal runaway is a positive feedback loop wherein an increase in temperature changes the system so as to cause further increases in temperature. The excess heat can result from battery mismanagement, battery defect, accident, or other causes. However, the excess heat generation often results from increased joule heating due to excessive internal current or from exothermic reactions between the positive and negative electrodes. Excessive internal current can result from a variety of causes, but a lowering of the internal resistance due to separator short circuit caused by the factors such as conductive particles spearing through the separator is one possible cause. Heat resulting from a separator short circuit can cause a further breach within the separator, leading to a mixing of the reagents of the negative and positive electrodes and the generation of further heat due to the resultant exothermic reaction.

Internal Short Circuit:

Lithium ion batteries employ a separator between the negative and positive electrodes to electrically separate the two electrodes from one another while allowing lithium ions to pass through. When the battery performs work by passing electrons through an external circuit, the permeability of the separator to lithium ions enables the battery to close the circuit. Short circuiting the separator by providing a conductive path across it allows the battery to discharge rapidly. A short circuit across the separator can result from improper charging and discharging or cell manufacturing defects such as metal impurities and metal shard formation during electrode production. More particularly, improper charging can lead to the deposition of metallic lithium dendrites on the surface of the negative electrode and grow to penetrate the separator through the nanopores so as to provide a conductive path for electrons from one electrode to the other. In addition, improper discharge at or below 1.5V will cause copper dissolution which can ultimately lead to the formation of metallic copper dendrites on the surface of the negative electrode which can also grow to penetrate the separator through the nanopore. The lower resistance of these conductive paths allows for rapid discharge and the generation of significant joule heat. Overheating and thermal runaway can result.

What was needed was a combination internal current limiter and current interrupter that could, at first, limit the rate of internal discharge resulting from an internal short circuit so as to reduce the generation of Joule heat, if the rate of internal discharge is insufficiently limited, could also interrupt the internal short circuit to further curtail the rate of internal discharge, regardless of the temperature increase, so as to avert fire and/or explosion.

SUMMARY

A first aspect of the disclosure is directed to an improved high energy density rechargeable (HEDR) battery of a type including two electrodes of opposite polarity (12 and 14). Each electrode is characterized by its resistivity, by its safe operating temperature range, and its safe charging voltage. The HEDR is further of a type having a separator 2 for separating the two electrodes (12 and 14) and preventing internal discharge there between and at least one electrode (12 or 14) employing a current collector 4 for transferring electrons. The separator 2 is subject to a risk of forming a short circuit. The short circuit can potentially allow a rapid internal discharge between the two electrodes (12 and 14), potentially allowing a rapid production of joule heat therefrom, the rapid production of joule heat potentially allowing a thermal runaway. The two electrodes (12 and 14) are subject to a risk of overcharge above the safe charging voltage and the formation of the short circuit therefrom. The two electrodes (12 and 14) are subject to a risk of thermal runaway above the safe operating temperature range.

The improvement for this first aspect of the disclosure is employable for slowing the rate of internal discharge resulting from the short circuit, for slowing the production of joule heat therefrom, and for reducing the risk of thermal runaway.

The improvement comprises the addition to the HEDR battery of a current limiter 6 combined with a current interrupter 8.

The current limiter 6 forms an electrical coupling between one of the electrodes (12 or 14) and its corresponding current collector 4. The current limiter 6 has a resistivity for resistively impeding current therethrough and, in the event the separator 2 forms the short circuit, for diverting current from the electrode current collector 4 to which it is coupled, and for reducing the rate of the internal discharge between the two electrodes (12 and 14).

The current interrupter 8 has an engaged configuration, a disengaged configuration, and a gas generating component for transitioning said current interrupter 8 from the engaged to the unengaged configuration. The gas generating component also has a trigger for generating a gas. The trigger is selected from the group consisting of temperature triggers and voltage triggers.

The temperature triggers is activatable above the safe operating temperature range.

The voltage triggers is activatable above the safe charging voltage.

In its engaged configuration, the current interrupter 8 electrically couples one of the electrodes (12 or 14) and its corresponding current collector 4 with a laminated connection.

In disengaged configuration, the laminated connection becomes delaminated and the current interrupter 8 forms a nonconductive gap for interrupting the electrical coupling between the electrode (12 or 14) and its corresponding current collector 4.

The current interrupter 8 transitions from its engaged configuration to its disengaged configuration by triggering the gas generating component responsive to the trigger. The resulting generated gas delaminates the laminated connection for interrupting the electrical coupling between the electrode (12 or 14) and its corresponding current collector 4.

In this first aspect of the disclosure, the current limiter 6 and the current interrupter 8, in combination, diminishes the risk of thermal runaway resulting from separator short circuit, electrode overcharge, and electrode overheating.

In one embodiment of this first aspect of the disclosure, the current limiter 6 and the current interrupter 8 are simultaneously incorporated into a protective layer interposed by lamination between the same electrode (12 or 14) and current collector 4.

In another embodiment of this first aspect of the disclosure, the battery is of a type having two current collectors 4, including a first current collector 4 and a second current collector 4. The two electrodes (12 and 14) include a first electrode and a second electrode. The first electrode includes a first portion and a second portion. The second portion of the first electrode is interposed between the first portion of the first electrode and the first current collector 4. The improvement of this embodiment of the disclosure is further characterized by the current limiter 6 being layered between the first portion of the first electrode and the second portion of the first electrode; and the current interrupter 8 being layered between the second portion of the first electrode and the first current collector 4. In a sub-embodiment of this first aspect of the disclosure, the current limiter 6 is layered between the second portion of the first electrode and the first current collector 4, and the current interrupter 8 is layered between the first portion of the first electrode and the second portion of the first electrode.

In another embodiment of this first aspect of the disclosure, the battery is of a type having two current 4, including a first current collector 4 and a second current collector 4 and the two electrodes (12 and 14) including a first electrode and a second electrode, the improvement further characterized wherein. In this embodiment, the current limiter 6 is layered between the first electrode and the first current collector 4; and the current interrupter 8 being layered between the second electrode and the second current collector 4.

In another embodiment of this first aspect of the disclosure, the battery is of a type wherein each electrode (12 or 14) has a temperature range for safe operation and an internal resistivity therein. In this embodiment, the current limiter 6 has a resistivity greater than the internal resistivity of the electrode (12 or 14) with which said current limiter 6 is layered within the temperature range for safe operation.

In another embodiment of this first aspect of the disclosure, the improvement is further characterized by the current limiter 6 lacking a resistivity transition switch at temperatures within the temperature range for safe operation.

In another embodiment of this first aspect of the disclosure, the battery is of a type wherein each electrode (12 and 14) has a temperature range for standard operation. In this embodiment, the current limiter 6 has a resistivity transition with a resistivity less than the internal resistivity of the electrode (12 and/or 14) within the temperature range for standard operation and a resistivity greater than the internal resistivity of the electrode (12 and/or 14) above the temperature range for standard operation.

In another embodiment of this first aspect of the disclosure, the battery is of a type wherein each electrode (12 and 14) has a temperature range for standard operation. In this embodiment, the current interrupter 8 is activated by temperature above the temperature range for standard operation.

In another embodiment of this first aspect of the disclosure, the battery is of a type wherein each electrode (12 and 14) has a temperature range for standard operation and a temperature range for safe operation. In this embodiment, the current interrupter 8 is activated by temperature above the temperature range for standard operation and within the temperature range for safe operation.

In another embodiment of this first aspect of the disclosure, the battery is of a type wherein each electrode (12 and 14) has an internal resistivity within the temperature range for safe operation. In this embodiment, the current limiter 6 has a resistivity greater than the internal resistivity of the electrode (12 or 14) with which said current limiter 6 is layered within the temperature range for safe operation. In an alternative to this embodiment, the current limiter 6 and said current interrupter 8 are simultaneously incorporated into a protective layer interposed by lamination between the same electrode (12 or 14) and current collector 4.

In another embodiment of this first aspect of the disclosure, the battery is of a type wherein each electrode (12 and 14) has a voltage range for standard operation. In this embodiment, the current interrupter 8 is activated by voltage above the voltage range for standard operation.

In another embodiment of this first aspect of the disclosure, the battery is of a type wherein each electrode (12 and 14) has a voltage range for standard operation and a voltage range for safe operation. In this embodiment, the current interrupter 8 is activated by voltage above the temperature range for standard operation and within the voltage range for safe operation. In an alternative of this embodiment, the current limiter 6 and current interrupter 8 are simultaneously incorporated into a protective layer interposed by lamination between the same electrode (12 or 14) and current collector 4.

A second aspect of the disclosure is directed to another improved high energy density rechargeable battery of a type including two electrodes (12 and 14) of opposite polarity, a separator 2 separating the two electrodes (12 and 14), and at least one current collector 4 electrically coupled to one of the electrodes (12 or 14). The separator 2 prevents internal discharge between the two electrodes (12 and 14). Failure of the separator 2 potentially causes an internal discharge between the two electrodes (12 and 14). The internal discharge causes the generation of joule heat of potential danger.

The improvement for this second aspect of the disclosure comprises a thermally activatable current interrupter 8 and a voltage activatable current interrupter 8.

The thermally activatable current interrupter 8 is layered by lamination between one of the current collectors 4 and one of the electrodes (12 or 14). The thermally activatable current interrupter 8, when unactivated, electrically couples the current collector 4 to the electrode (12 or 14) with which it is layered, said current interrupter 8. When activated, the thermally activatable current interrupter 8 delaminates from the current collector 4 for forming a nonconductive gap for electrically decoupling the current collector 4 from the electrode (12 or 14) with which it had been layered. The electrical decoupling serves to slow the rate of internal discharge between the two electrodes (12 and 14) in the event of separator failure.

The voltage activatable current interrupter 8 is layered by lamination between one of the current collectors 4 and one of the electrodes (12 or 14). The voltage activatable current interrupter 8, when unactivated, electrically couples the current collector 4 to the electrode (12 or 14) with which it is layered. The current interrupter 8, when activated, delaminates from the current collector 4 by forming a nonconductive gap for electrically decoupling the current collector 4 from the electrode (12 or 14) with which it had been layered. The resultant electrical decoupling serves to slow the rate of internal discharge between the two electrodes (12 and 14) in the event of separator failure. In this second aspect of the disclosure, activation of either the thermally activated current interrupter 8 or the voltage activated current interrupter 8 in the event of separator failure, slows the generation joule heat for diminishing the potential danger.

A second aspect of the disclosure is directed to a process for avoiding thermal runaway within a high energy density rechargeable battery undergoing internal discharge due to separator failure. The process comprises the step of delaminating an electrode (12 or 14) within the battery from its current collector 4 by generating a gas from a heat sensitive gas generating material within an interrupt layer interposed between the electrode (12 or 14) and current collector 4. The delamination electrically decouples the electrode (12 or 14) from its current collector 4 for slowing the rate of internal discharge.

A third aspect of the disclosure is directed to a process for avoiding thermal runaway within a high energy density rechargeable battery at risk of suffering from separator failure due to voltage overcharge. The process comprises the step of delaminating an electrode (12 or 14) within the battery from its current collector 4 by generating a gas from a voltage sensitive gas generating material within an interrupt layer interposed between the electrode (12 or 14) and current collector 4. The delamination electrically decouples the electrode (12 or 14) from its current collector 4 for interrupting the voltage overcharge.

A fourth aspect of the disclosure is directed to a process for avoiding thermal runaway within a high energy density rechargeable battery at risk of suffering from separator failure due to voltage overcharge. The process comprises the step of delaminating an electrode (12 or 14) within the battery from its current collector 4 by generating a gas from a voltage or temperature sensitive material that will form the gas indirectly through its decomposition compound (at the high voltage) that will react with the battery components such as electrolyte and electrodes (12 and 14). This voltage or temperature sensitive material will be still called as gas generator, and can be within an interrupt layer interposed between the electrode (12 or 14) and current collector 4. The delamination electrically decouples the electrode (12 or 14) from its current collector 4 for interrupting the voltage overcharge.

BRIEF DESCRIPTION OF DRAWINGS

The present disclosure is described more fully herein with reference to the accompanying drawings, in which some exemplary embodiments of the present disclosure are shown. As those skilled in the art would realize, the described embodiments may be modified in various different ways, all without departing from the spirit or scope of the present disclosure. Accordingly, the drawings and description are to be regarded as illustrative in nature and not restrictive. In the drawings, the thicknesses of layers and regions may be exaggerated for clarity.

The terminology used herein is for the purpose of describing some particular exemplary embodiments only and is not intended to be limiting of the disclosure. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," etc. may be used herein to describe various members, elements, regions, layers and/or parts, these members, elements, regions, layers and/or parts should not be limited by these terms. These terms may be used merely to distinguish one member, element, region, layer and/or part from another member, element, region, layer and/or part. Thus, for example, a first member, element, region, layer and/or part discussed below could be termed a second member, element, region, layer and/or part without departing from the teachings of the present disclosure.

FIGS. 1A-1G illustrate schematic representations of exemplary configurations of film-type lithium ion batteries having one or more resistive layers serving as current limiters 6, for protecting the battery against overheating in the event of an internal short circuit, combined with current interrupters 8 that are thermally activatable by an increase in temperature, for irreversibly interrupting the self-discharge process in the event that the battery should overheat or achieve an or unsafe temperature.

Figure 2A:
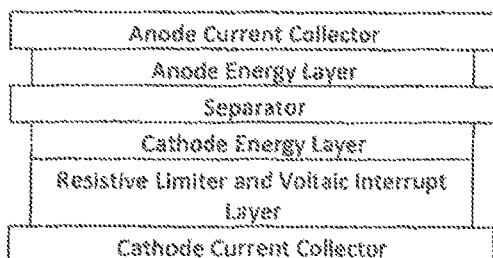
Figure 2B:
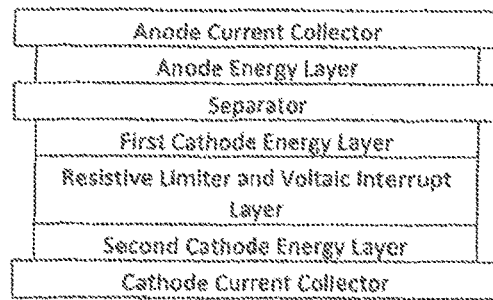

FIGS. 2A and 2B illustrate schematic representations of exemplary configurations of film-type lithium ion batteries having one or more layers serving as combined current limiters 6 and current interrupters 8, for protecting the battery against overheating in the event of an internal short circuit, combined with current interrupters 8 that are voltaicly activable by an increase in voltage, for irreversibly interrupting the self-discharge process in the event that the battery should become overcharged.

Figure 3A:
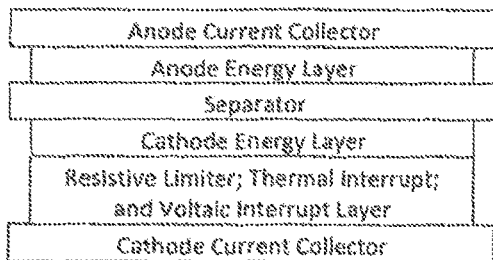
Figure 3B:
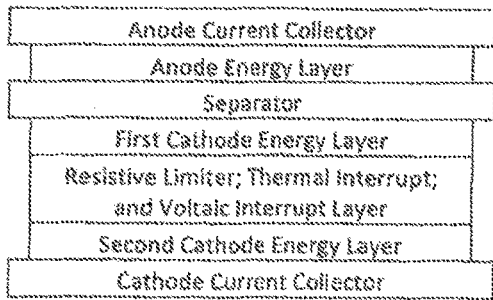

FIGS. 3A and 3B illustrate schematic representations of exemplary configurations of film-type lithium ion batteries having one or more resistive layers serving a current limiters 6 for protecting the battery against overheating in the event of an internal short circuit, combined with current interrupters 8 that are thermally activable by an increase in temperature, for irreversibly interrupting the self-discharge process in the event that the battery should overheat or achieve an or unsafe temperature, and further combined with current interrupters 8 that are voltaicly activable by an increase in voltage, for irreversibly interrupting the self-discharge process in the event that the battery should become overcharged.

Figure 4A:
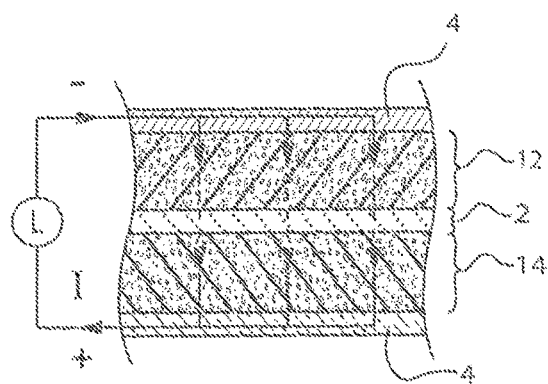
Figure 4B:
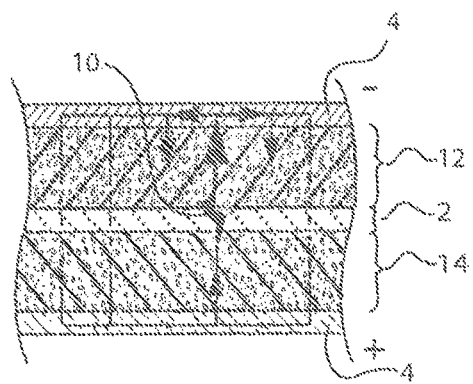
Figure 4C:
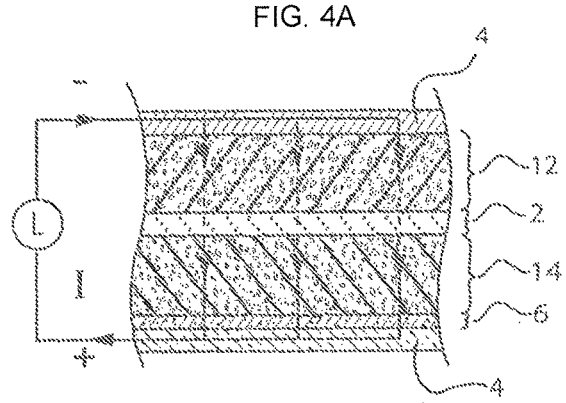
Figure 4D:
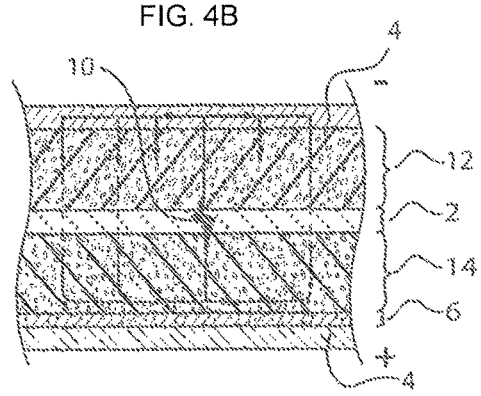

FIGS. 4A-4D illustrate cross sectional views of prior art film-type lithium ion batteries (FIGS. 4A and B) and of film-type lithium ion batteries of the present disclosure (FIGS. 4C and D). FIGS. 4C and D illustrate the film-type lithium ion batteries of FIG. 1A, 2A, or 3A. More particularly, FIG. 4 illustrates the current flow through film-type lithium ion batteries undergoing discharge for powering a load (L). FIGS. 4A and C illustrate the current flow of film-type lithium ion batteries having an intact fully operational separator 2 (unshorted). FIGS. 4B and D illustrate the current flow of film-type lithium ion batteries having resistive layer serving as a current limiter 6, wherein the separator 2 has been short circuited by a conductive dendrite 10 penetrating therethrough. In FIGS. 4B and D, the cells are undergoing internal discharge due to a dendrite 10 penetrating the separator 2. Note that devices with unshorted separators 2 (FIGS. 4A and C) and the prior art device with the shorted separator 2 (FIG. 4B), current flows from one current collector 4 to the other. However, in the exemplary device of the present disclosure having a shorted separator 2 and resistive layer 6 (FIG. 4D), current flow is diverted from the current collector 4 and is much reduced. In FIG. 4D, the interrupter 8 has not been triggered.

Figure 5A:
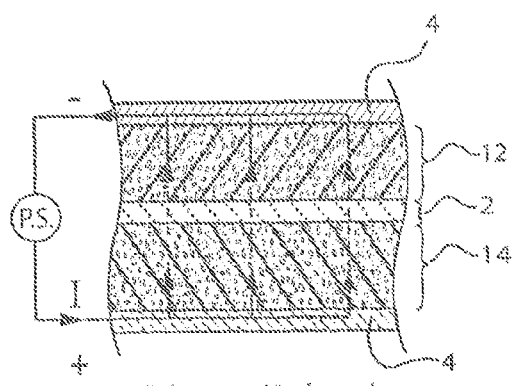
Figure 5B:
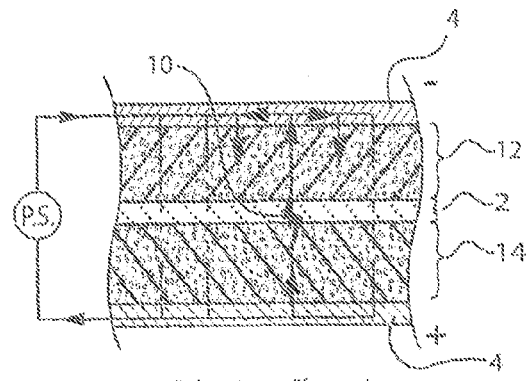
Figure 5C:
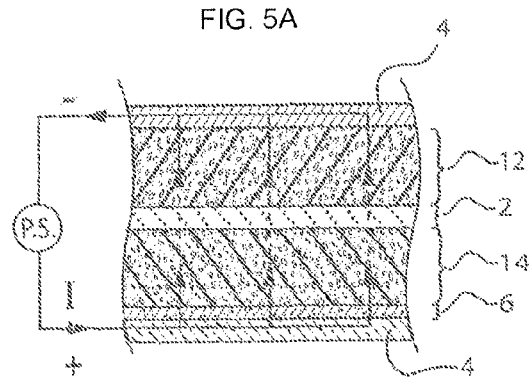
Figure 5D:
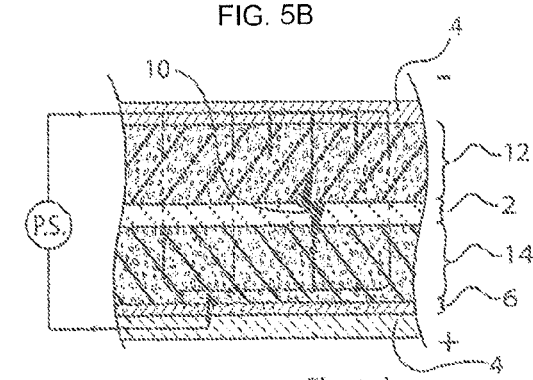

FIGS. 5A-5D illustrate cross sectional views of prior art film-type lithium ion batteries (FIGS. 5A and B) and of film-type lithium ion batteries of the present disclosure (FIGS. 5C and D). FIGS. 5C and D illustrate the film-type lithium ion batteries of FIG. 1A, 2A, or 3A. More particularly, FIG. 5 illustrates the current flow through film-type lithium ion batteries while it's being charged by a power supply (PS). FIGS. 5A and C illustrate the current flow of film-type lithium ion batteries having an intact fully operational separator 2 (unshorted). FIGS. 5B and D illustrate the current flow of film-type lithium ion batteries having a separator 2 shorted by a conductive dendrite 10. Note that devices with unshorted separators 2 (FIGS. 5A and C) and the prior art device with the shorted separator 2 (FIG. 5B), current flows from one current collector 4 to the other. However, in the exemplary device of the present disclosure having a shorted separator 2 and resistive layer 6 (FIG. 5D), current flow is diverted from the current collector 4 and is much reduced. In FIG. 5D, the interrupter 8 has not been triggered.

Figure 6A:
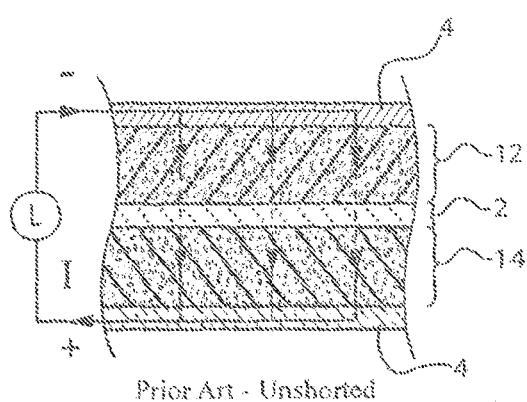
Figure 6B:
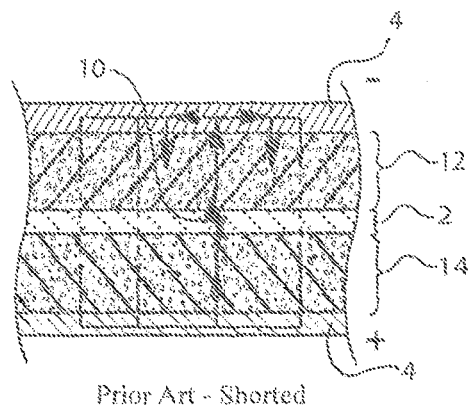
Figure 6C:
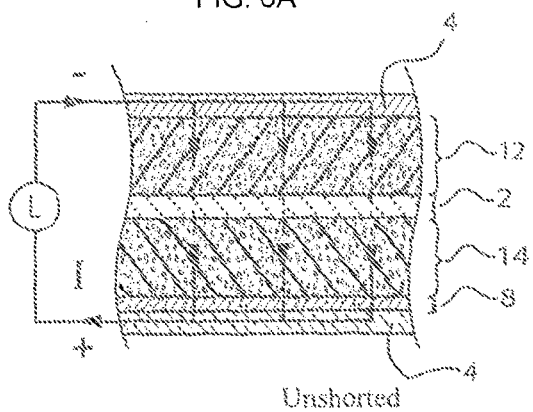
Figure 6D:
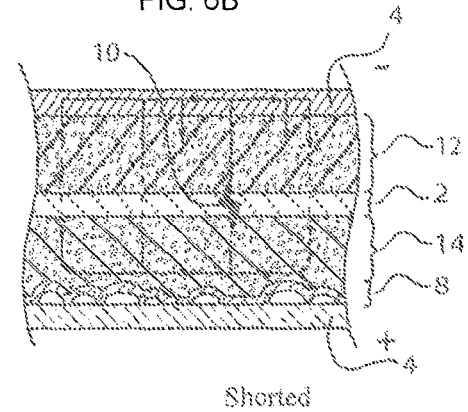

FIGS. 6A-6D illustrate cross sectional views of prior art film-type lithium ion batteries (FIGS. 8A and B) and of film-type lithium ion batteries of the present disclosure (FIGS. 6C and D). FIGS. 6C and D illustrate the film-type lithium ion batteries of FIG. 1A, 2A, or 3A, after the interrupter 8 has been triggered by excessive temperature or voltage. More particularly, FIG. 6 illustrates the current flow through film-type lithium ion batteries undergoing discharge for powering a load (L). FIGS. 6A and C illustrate the current flow of film-type lithium ion batteries having an intact fully operational separator 2 (unshorted). FIGS. 6B and D illustrate the current flow of film-type lithium ion batteries having a short circuit caused by a conductive dendrite 10 penetrating the separator 2. Note that devices with unshorted separators 2 (FIGS. 6A and C) and the prior art device with the shorted separator 2 (FIG. 6B), current flows from one current collector 4 to the other. However, in the exemplary device of the present disclosure having a shorted separator 2 and both a resistive layer (current limiter 6) and a current interrupter 8 (FIG. 6D), current flow is diverted from the current collector 4 and is much reduced. In FIG. 6D, the interrupter 8 has been triggered.

Figure 7A:
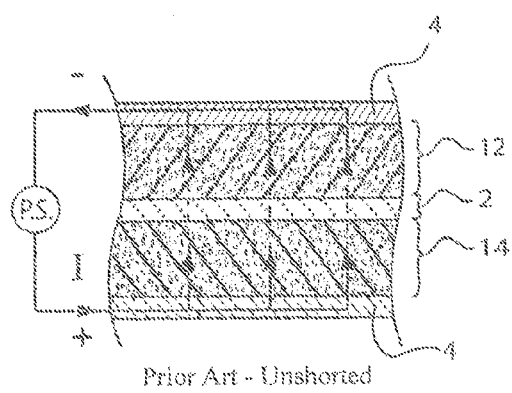
Figure 7B:
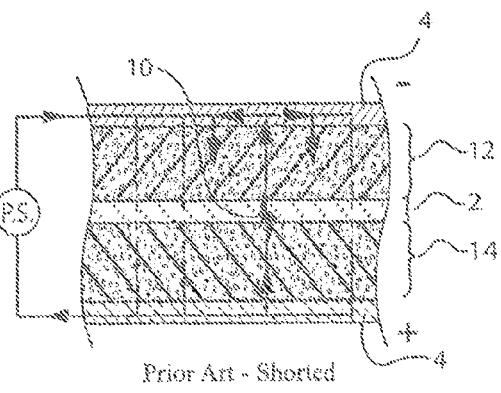
Figure 7C:
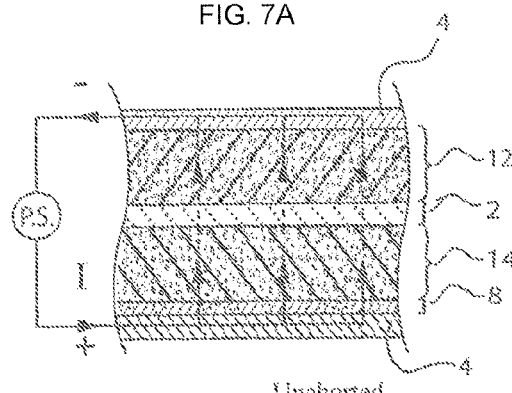
Figure 7D:
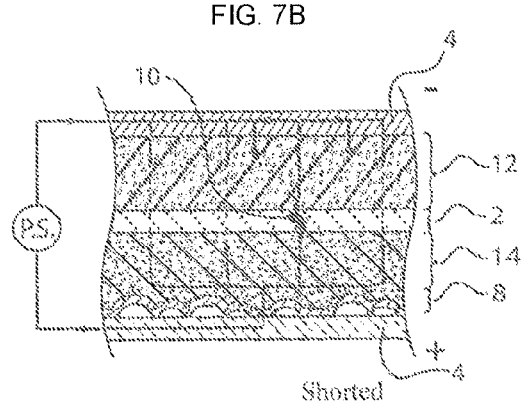

FIGS. 7A-7D illustrate cross sectional views of prior art film-type lithium ion batteries (FIGS. 7A and B) and of film-type lithium ion batteries of the present disclosure (FIGS. 7C and D). FIGS. 7C and D illustrate the film-type lithium ion batteries of FIG. 1A, 2A, or 3A, after the interrupter 8 has been triggered by excessive temperature or voltage. More particularly, FIG. 7 illustrates the current flow through film-type lithium ion batteries while it's being charged by a power supply (PS). FIGS. 7A and C illustrate the current flow of film-type lithium ion batteries having an intact fully operational separator 2 (unshorted). FIGS. 7B and D illustrate the current flow of film-type lithium ion batteries having a having a short circuit caused by a separator 2 shorted by a dendrite 10. Note that devices with unshorted separators 2 (FIGS. 7A and C) and the prior art device with the shorted separator 2 (FIG. 7B), current flows from one current collector 4 to the other. However, in the exemplary device of the present disclosure having a shorted separator 2 and resistive layer 6 (current limiter 6) (FIG. 7D), current flow is diverted from the current collector 4 and is much reduced. In FIG. 7D, the interrupter 8 has been triggered.

Figure 8A:
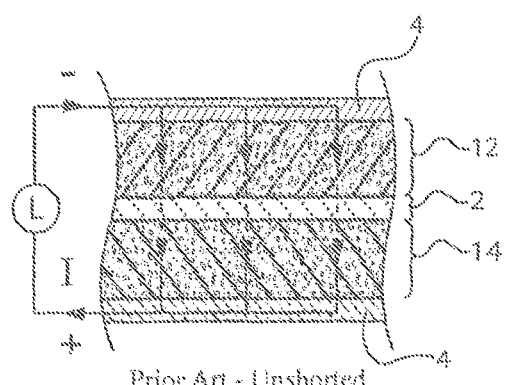
Figure 8B:
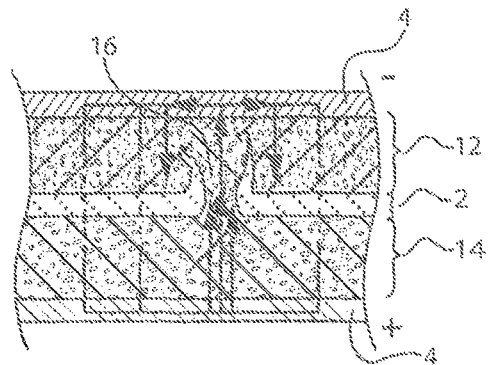
Figure 8C:
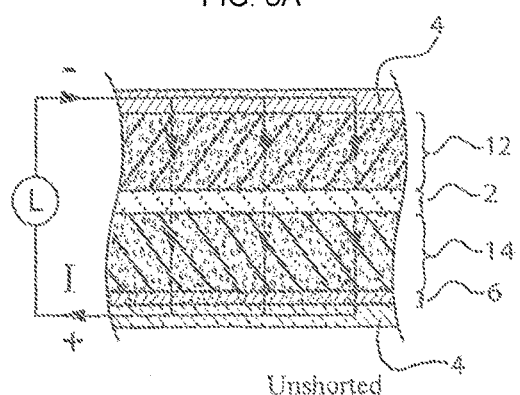
Figure 8D:
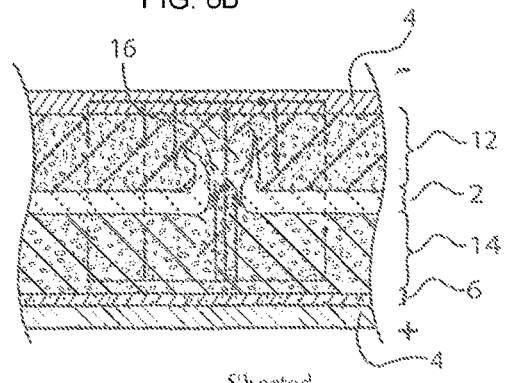

FIGS. 8A-8D illustrate cross sectional views of prior art film-type lithium ion batteries (FIGS. 8A and B) and of film-type lithium ion batteries of the present disclosure (FIGS. 8C and D). FIGS. 8C and D illustrate the film-type lithium ion batteries of FIG. 1A, 2A, or 3A. More particularly, FIG. 8 illustrates the current flow through film-type lithium ion batteries undergoing discharge for powering a load (L). FIGS. 8A and C illustrate the current flow of film-type lithium ion batteries having an intact fully operational separator 2 (unshorted). FIGS. 8B and D illustrate the current flow of film-type lithium ion batteries having resistive layer serving as a current limiter 6, wherein the separator 2 has been short circuited by a disruption 16. In FIGS. 8B and D, the cells are undergoing internal discharge due to a breach 16 penetrating the separator 2. Note that devices with unshorted separators 2 (FIGS. 8A and C) and the prior art device with the shorted separator 2 (FIG. 8B), current flows from one current collector 4 to the other. However, in the exemplary device of the present disclosure having a shorted separator 2 and resistive layer 6 (FIG. 8D), current flow is diverted from the current collector 4 and is much reduced. In FIG. 8D, the interrupter 8 has not been triggered.

Figure 9A:
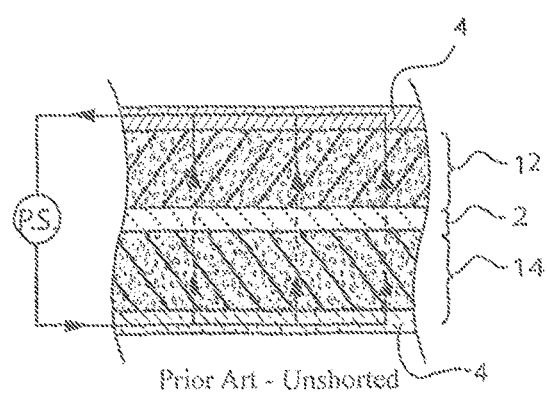
Figure 9B:
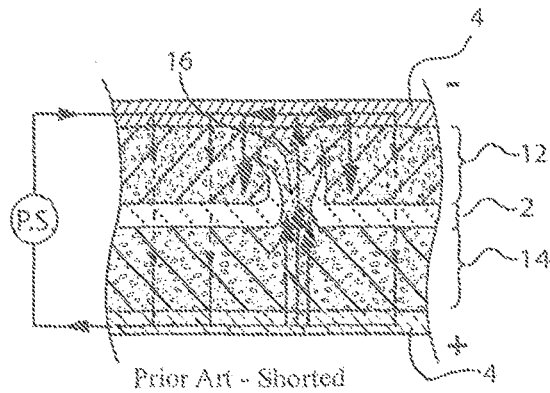
Figure 9C:
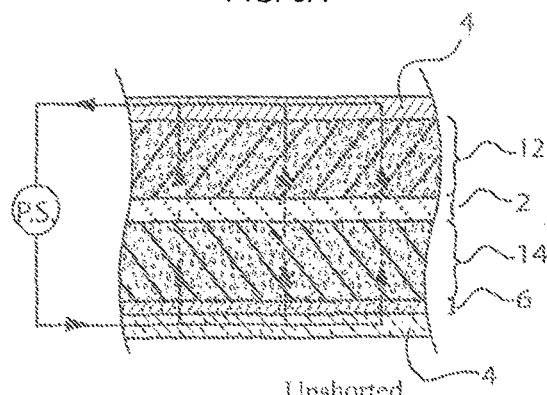
Figure 9D:
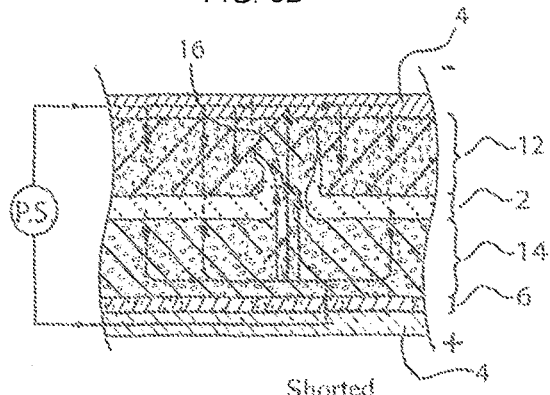

FIGS. 9A-9D illustrate cross sectional views of prior art film-type lithium ion batteries (FIGS. 9A and B) and of film-type lithium ion batteries of the present disclosure (FIGS. 9C and D). FIGS. 9C and D illustrate the film-type lithium ion batteries of FIG. 1A, 2A, or 3A. More particularly, FIG. 9 illustrates the current flow through film-type lithium ion batteries while it's being charged by a power supply (PS). FIGS. 9A and C illustrate the current flow of film-type lithium ion batteries having an intact fully operational separator 2 (unshorted). FIGS. 9B and D illustrate the current flow of film-type lithium ion batteries having a having a separator 2 shorted by a by a disruption 16. Note that devices with unshorted separators 2 (FIGS. 9A and C) and the prior art device with the shorted separator 2 (FIG. 9B), current flows from one current collector 4 to the other. However, in the exemplary device of the present disclosure having a shorted separator 2 and resistive layer 6 (FIG. 9D), current flow is diverted from the current collector 4 and is much reduced. In FIG. 9D, the interrupter 8 has not been triggered.

Figure 10A:
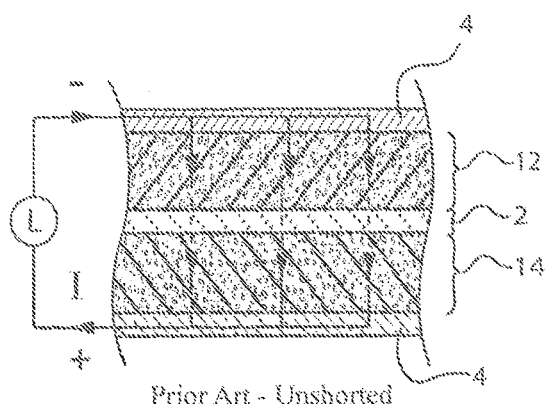
Figure 10B:
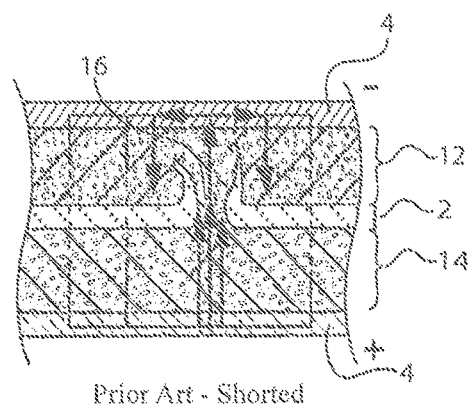
Figure 10C:
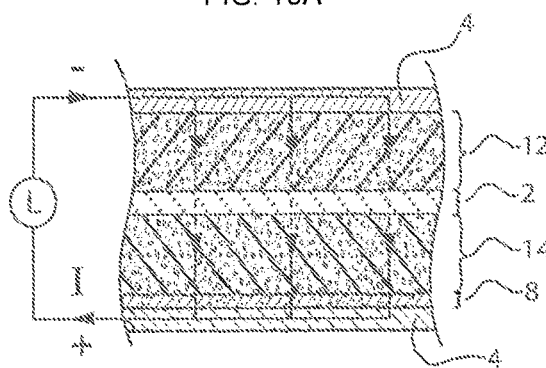
Figure 10D:
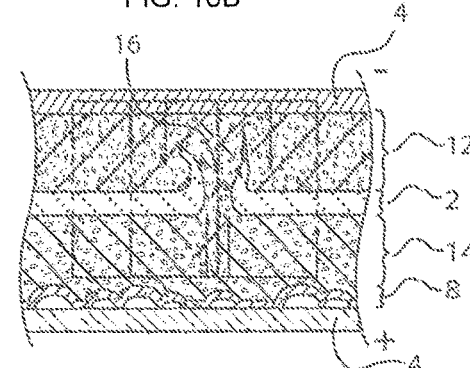

FIGS. 10A-10D illustrate cross sectional views of prior art film-type lithium ion batteries (FIGS. 10A and B) and of film-type lithium ion batteries of the present disclosure (FIGS. 10C and D). FIGS. 10C and D illustrate the film-type lithium ion batteries of FIG. 1A, 2A, or 3A, after the interrupter 8 has been triggered by excessive temperature or voltage. More particularly, FIG. 10 illustrates the current flow through film-type lithium ion batteries undergoing discharge for powering a load (L). FIGS. 10A and C illustrate the current flow of film-type lithium ion batteries having an intact fully operational separator 2 (unshorted). FIGS. 10B and D illustrate the current flow of film-type lithium ion batteries having a short circuit caused by a disruption 16. Note that devices with unshorted separators 2 (FIGS. 10A and C) and the prior art device with the shorted separator 2 (FIG. 10B), current flows from one current collector 4 to the other. However, in the exemplary device of the present disclosure having a shorted separator 2 and both a resistive layer (current limiter 6) and a current interrupter 8 (FIG. 6D), current flow is diverted from the current collector 4 and is much reduced. In FIG. 10D, the interrupter 8 has been triggered.

Figure 11A:
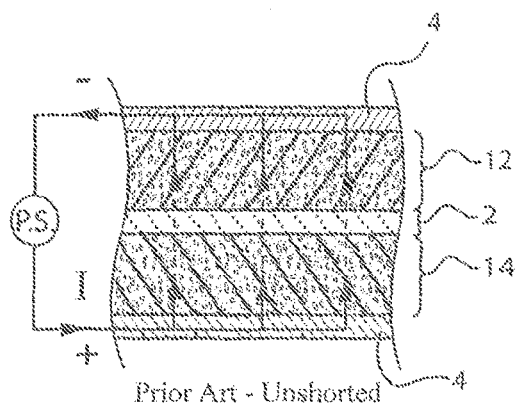
Figure 11B:
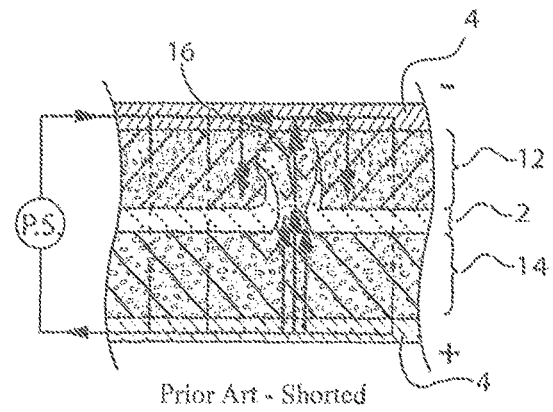
Figure 11C:
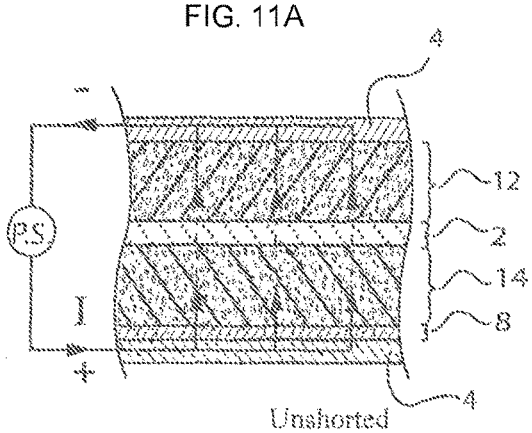
Figure 11D:
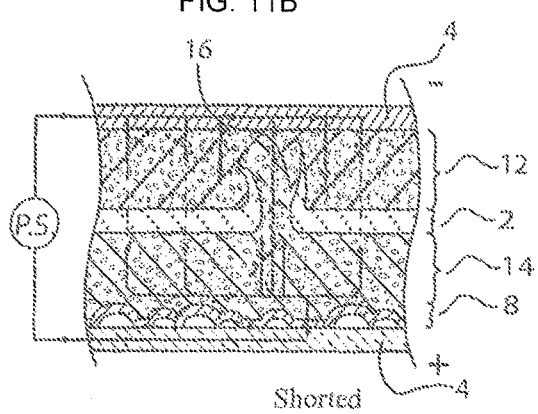

FIGS. 11A-11D illustrate cross sectional views of prior art film-type lithium ion batteries (FIGS. 11A and B) and of film-type lithium ion batteries of the present disclosure (FIGS. 11C and D). FIGS. 11C and D illustrate the film-type lithium ion batteries of FIG. 1A, 2A, or 3A, after the interrupter 8 has been triggered by excessive temperature or voltage. More particularly, FIG. 11 illustrates the current flow through film-type lithium ion batteries while it's being charged by a power supply (PS). FIGS. 11A and C illustrate the current flow of film-type lithium ion batteries having an intact fully operational separator 2 (unshorted). FIGS. 11B and D illustrate the current flow of film-type lithium ion batteries having a having a short circuit caused by a separator 2 shorted by a disruption 16. Note that devices with unshorted separators 2 (FIGS. 11A and C) and the prior art device with the shorted separator 2 (FIG. 11B), current flows from one current collector 4 to the other. However, in the exemplary device of the present disclosure having a shorted separator 2 and resistive layer 6 (current limiter 6) (FIG. 11D), current flow is diverted from the current collector 4 and is much reduced. In FIG. 11D, the interrupter 8 has been triggered.

Figure 12A:
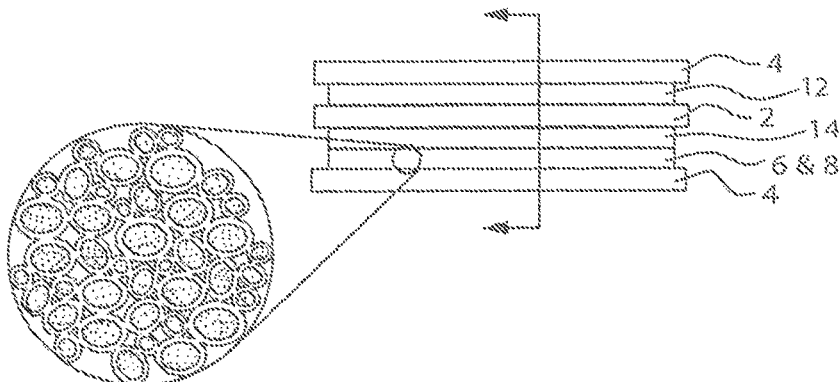
Figure 12B:
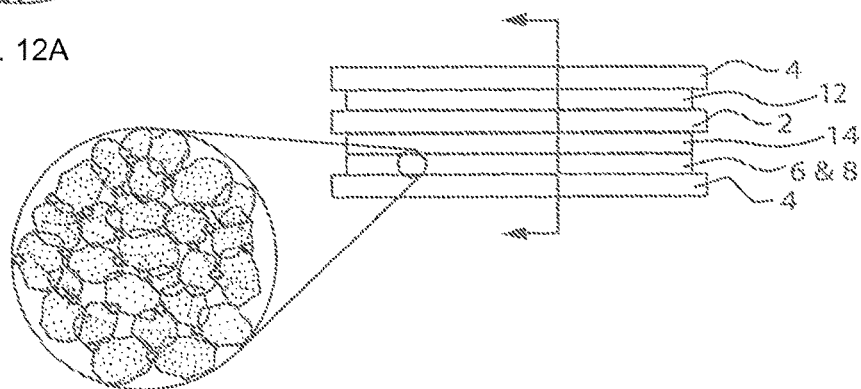
Figure 12C:
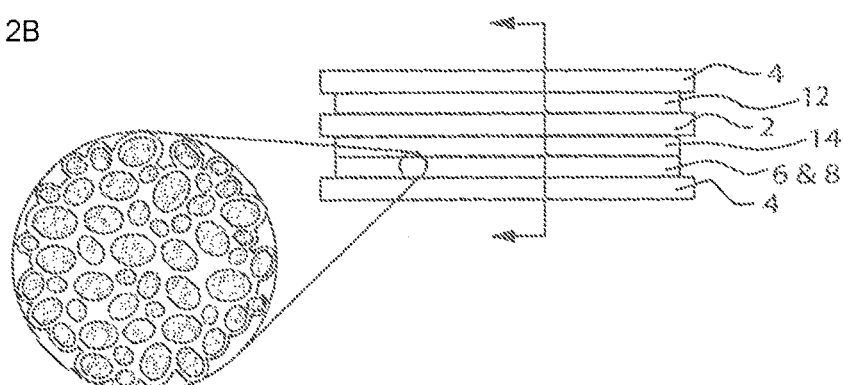

FIGS. 12A-12C illustrate exemplary structures for the combined current limiter 6 and current interrupter 8. FIG. 12A illustrates resistive layer 6 having a high proportion of ceramic particles coated with binder. Interstitial voids between the coated ceramic particles render the resistive layer 6 porous. FIG. 12B illustrates resistive layer 6 having a high proportion of ceramic particles bound together by particles of binder. Interstitial voids between the coated ceramic particles render the resistive layer 6 porous. FIG. 12C illustrates resistive layer 6 having an intermediate proportion of ceramic particles (less than 80%) held together with binder. The resistive layer 6 lacks interstitial voids between the coated ceramic particles and is non-porous.

FIGS. 13A and 13B illustrate exemplified Cell compositions.

FIG. 14 illustrates the various positive electrode 14 formulations use in chemical decomposition voltage measurements.

Figure 15:
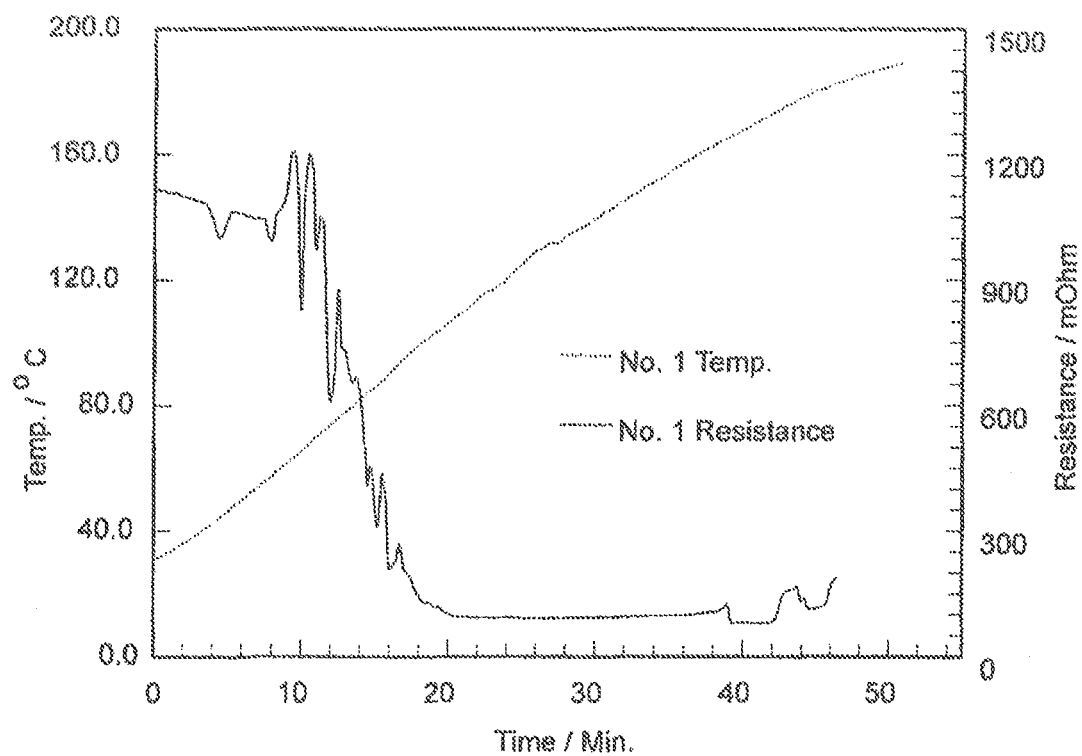

FIG. 15 illustrates the resistance of baseline Cell #2 at 3.6V vs graphite in relation to the temperature increase. The resistance decrease about 10 times with the increase in the temperature.

Figure 16:
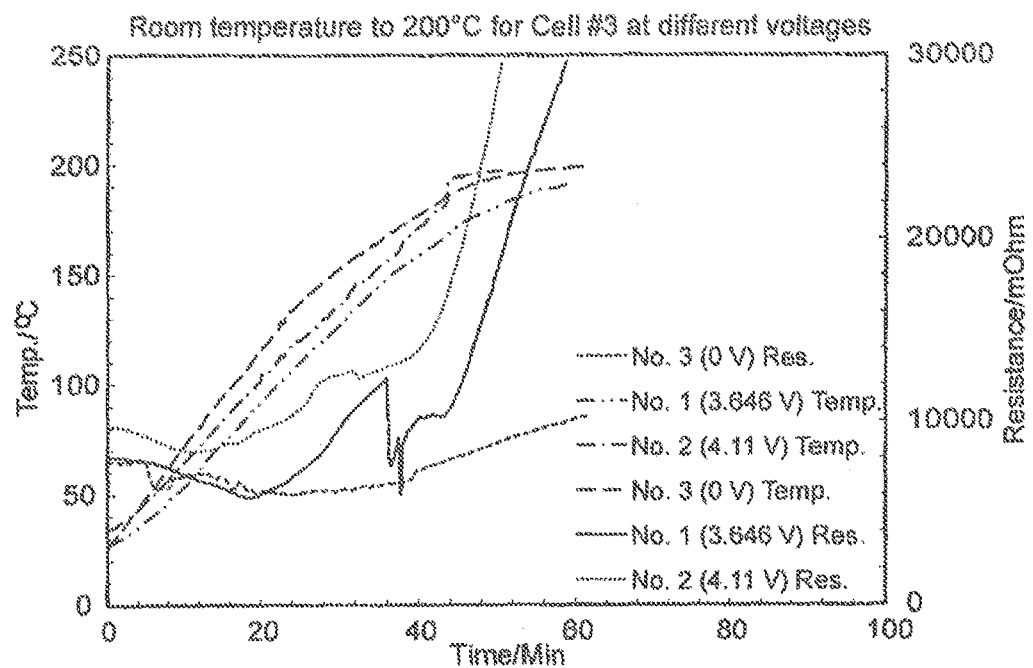

FIG. 16 illustrates the resistance of Cell #3 (positive electrode 14 with the $CaCO_3$ ceramic layer) at 0, 3.646, and 4.11 respectively, voltage vs graphite in relation to the temperature increase. The resistance increases slightly for zero voltage, and dramatically for 3.646 and 4.11 V.

Figure 17:
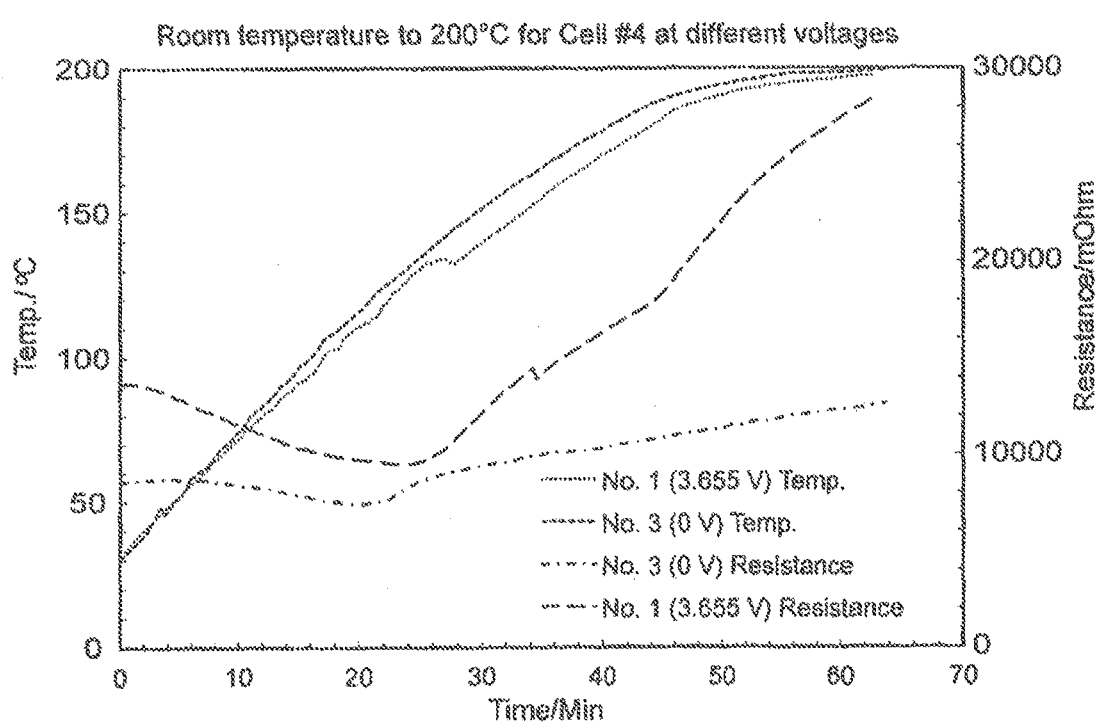

FIG. 17 illustrates the resistance of Cell #4 (positive electrode 14 with the $Al_2O_3$ and $CaCO_3$ ceramic layer) at 0V and 3.655V, respectively, voltage vs graphite in relation to the temperature increase. The resistance increases slightly for zero voltage, and dramatically for 3.655 V.

Figure 18:
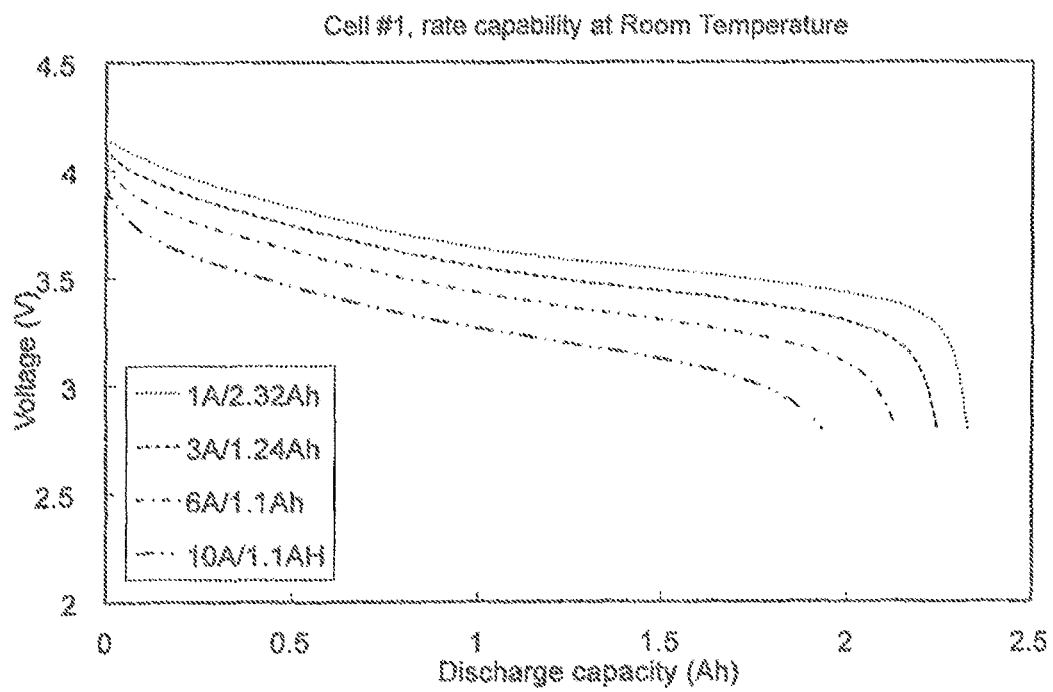

FIG. 18 illustrates the discharge capacity of baseline Cell #1 (no resistive layer) vs the cell voltage at 1 A, 3 A, 6 A and 10 A.

Figure 19:
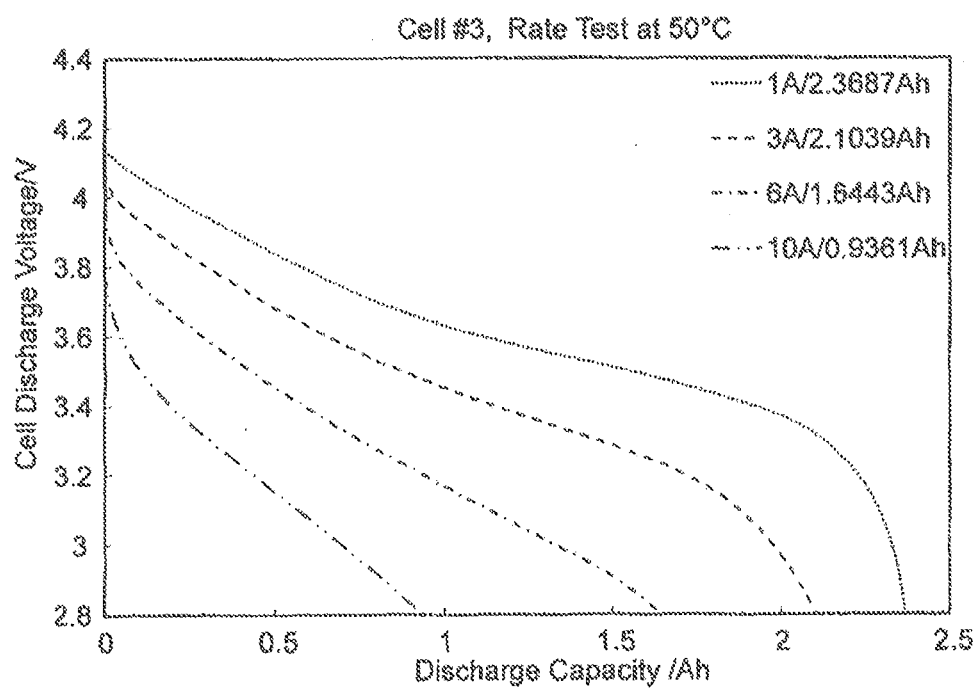

FIG. 19 illustrates the discharge capacity of Cell #3 (85.2% $CaCO_3$ based resistive layer 6) vs the cell voltage at 1 A, 3 A, 6 A and 10 A. The cell discharge capability decreases significantly with the increase in the cell discharge current with this particular resistive layer 6.

Figures 20, 21:
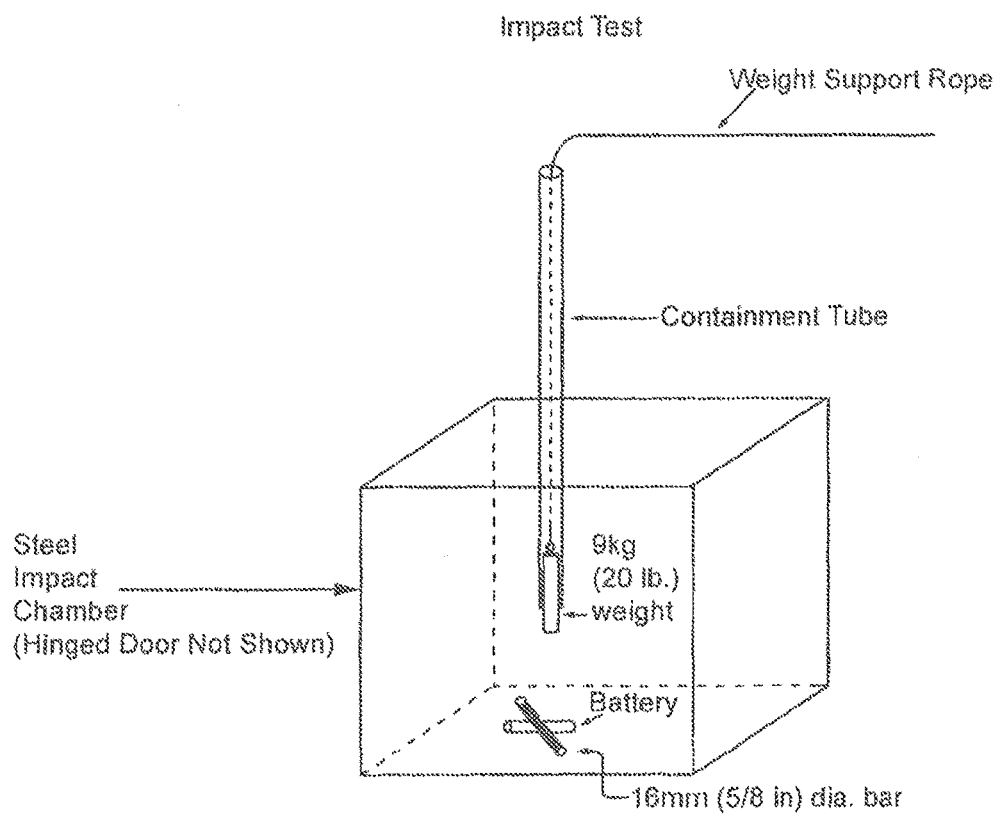

FIG. 20 summarizes the cell impedance and discharge capacities at 1 A, 3 A, 6 A and 10 A and their corresponding ratios of the capacity at 3 A, 6 A or 10 A over that at 1 A for Cell #1 (baseline), #3, #4, #5, and #6. The cell impedance at 1 KHz goes up with the resistive and gas-generator layer. The resistive layer 6 has caused the increase in the cell impedance since all cells with the resistive layer 6 gets higher impedance while the cell discharge capacity depends on the individual case.

FIG. 21 illustrates the Impact Test.

Figures 22, 23:
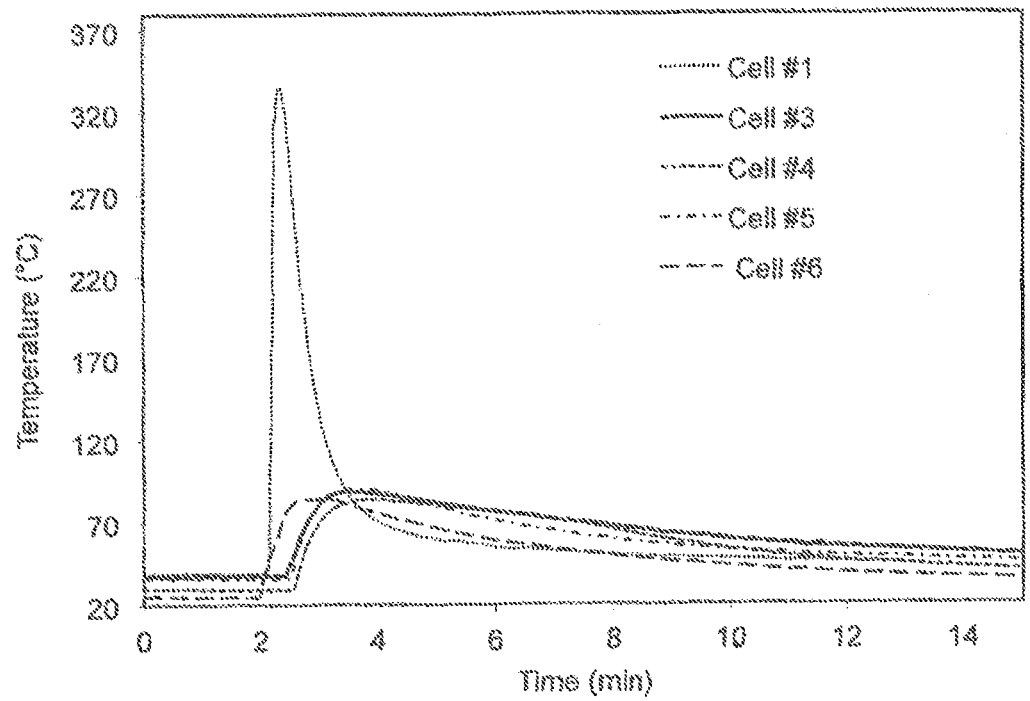

FIG. 22 illustrates the cell temperature profiles during the impact test for Cell #1 (baseline), #3, #5, and #6. The voltage of all tested cells dropped to zero as soon as the steel rod impact the cell. All cells with the resistive and gas-generator layer passed the test while the cell without any resistive layer 6 failed in the test (caught the fire). The maximum cell temperature during the impact test is summarized in FIG. 23.

FIG. 23 summarizes the cell maximum temperature in the impact test for Cell #1 (baseline), #3, #4, #5, and #6.

Figure 24:
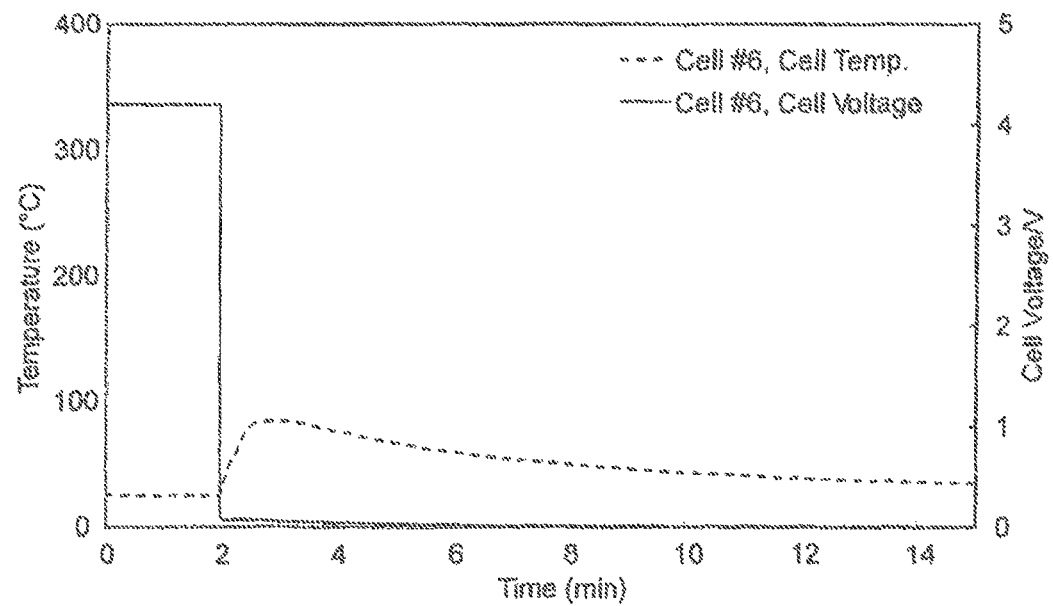

FIG. 24 illustrates the cell voltage and temperature vs the impact testing time for Cell #6. The impact starting time is set to 2 minutes. The cell voltage drop to zero as soon as the cell is impacted. The cell temperature is shown to increase rapidly.

Figure 25:
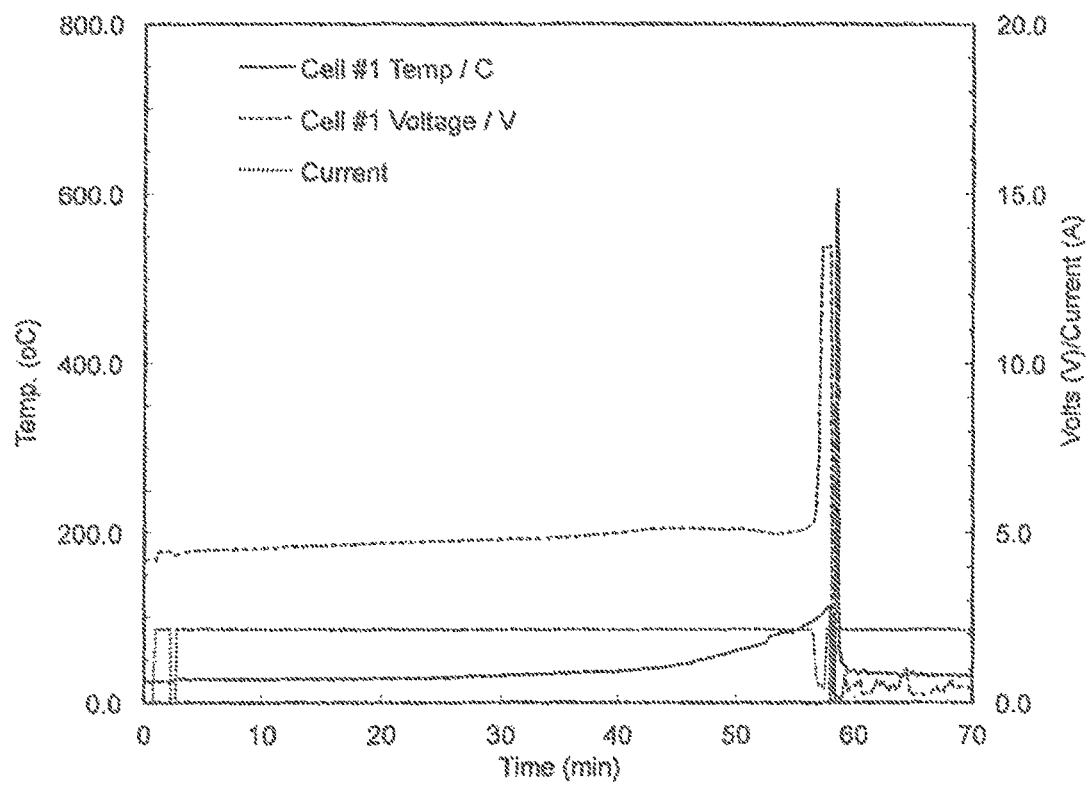

FIG. 25 illustrates the cell voltage and temperature vs the overcharging time for Cell #1 (no any protection layer). The cell voltage increased gradually up to 40 minutes and then decreased slightly and jumped to the maximum charge voltage rapidly at about 56 minutes while at the same time the cell temperature increased dramatically to above 600° C. The cell voltage and temperature then dropped to a very low value due to the connection being lost when the cell caught fire. The overcharge current was 2 A until the cell caught fire and then dropped to about 0.2 A for one or two minutes and then back to 2 A because the cell was shorted. The cell burned.

FIG. 26 illustrates the cell voltage and temperature vs the overcharging time for the cell with Cell #3 ($CaCO_3$ layer). The cell voltage increased gradually up to 40 minutes and then rapidly increased to a maximum charge voltage of 12V at about 55 minutes. The cell temperature rapidly increased to above 80° C. starting at about 40 minutes and then decreased rapidly. The over charge current decreased significantly at 55° C. and kept to 0.2 A for the rest of the testing time. The cell swelled significantly after the test.

FIG. 27 illustrates the cell voltage and temperature vs the overcharging time for Cell #5 ($Na_2O_7Si_3+Al_2O_3$ layer). The cell voltage increased gradually up to 40 minutes and then rapidly increased to a maximum charge voltage 12V at about 75 minutes. The cell overcharge voltage profiles is very different from $CaCO_3$ based resistive layer 6, which indicates the difference in the decomposition of $Na_2O_7Si_3$ compared with that of $CaCO_3$. The cell temperature increased significantly at about 40 minutes to above 75° C. and then decreased gradually. The over charge current decreased significantly at 75 minutes and kept to 1 A for the rest of the testing time. The cell swelled significantly after the test.

FIG. 28 summarizes the cell maximum temperature in the over charge test (2 A/12V) for Cell #1 (baseline), #3, #4, #5, and #6.

Figure 29:
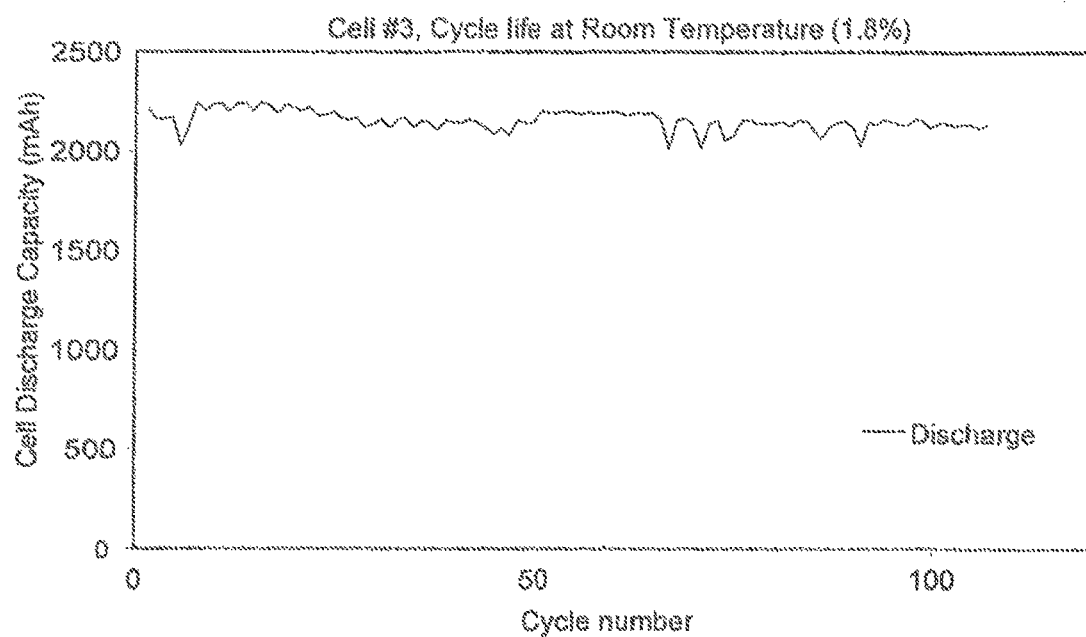

FIG. 29 illustrates the cycle life of Cell #3 ($CaCO_3$ resistive layer 6). The cell lost about 1.8% after 100 cycles which is lower than that of the cells without any resistive layer (~2.5% by average, not shown).

Figure 30:
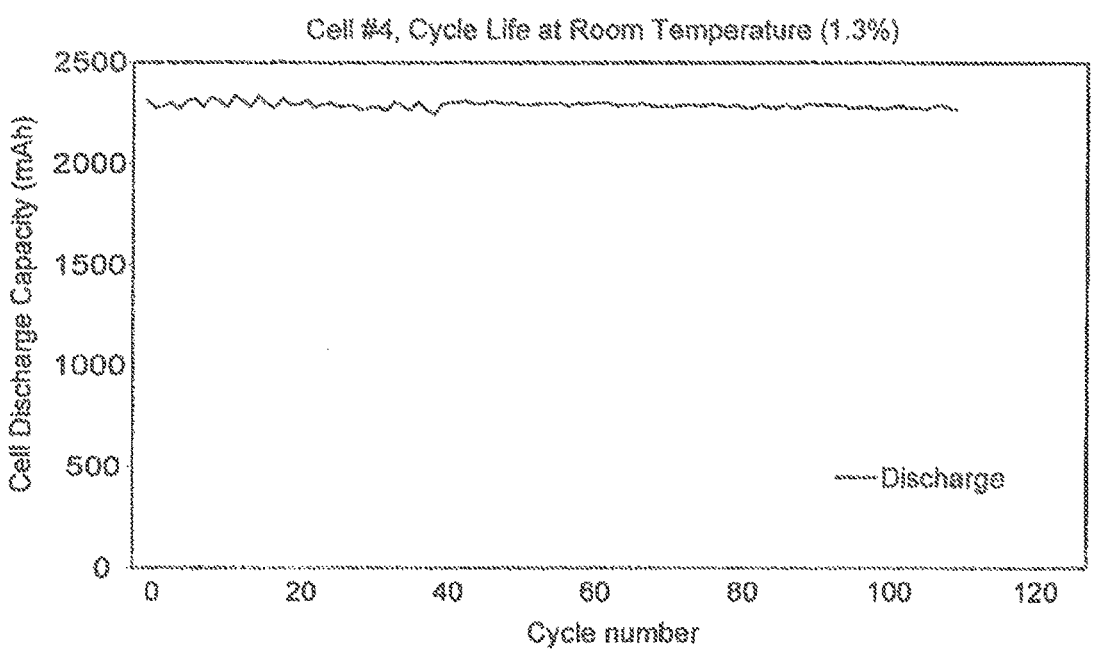

FIG. 30 illustrates the cycle life of Cell #4 ($CaCO_3$ and $Al_2O_3$ resistive layer 6). The cell lost about 1.3% after 100 cycles which is lower than that of the cells without any resistive layer (~2.5% by average, not shown).

Figures 31, 32:
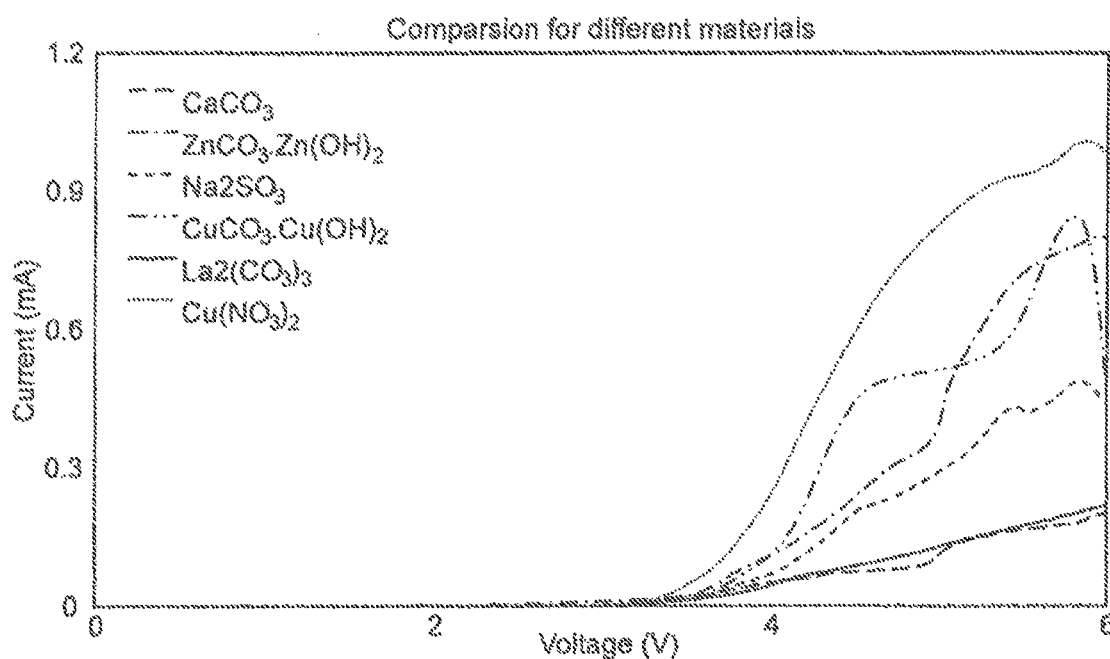

FIG. 31 illustrates the current profiles vs the voltage for compounds (gas generators) containing different anions for potential use in rechargeable batteries with different operation voltage. The peak current and voltages are listed in FIG. 32. The peak current for $Cu(NO_3)_2$ was the highest while the peak current for $CaCO_3$ was the lowest. The peak voltage for $Cu(NO_3)_2$ was the lowest while the peak voltage of $CaCO_3$ was the highest. Therefore, $Cu(NO_3)_2$ may be useful in lithium ion batteries with a relatively low operation voltage such as lithium ion cell using lithium iron phosphate positive electrode (3.7 V as the typical maximum charging voltage). $CaCO_3$ may be useful in lithium ion batteries with a high operation voltage like lithium ion cell using the high voltage positive such as lithium cobalt oxide (4.2V as the typical maximum charging voltage) or lithium nickel cobalt manganese oxides (4.3 or 4.4V as the typical high charging voltage).

FIG. 32 summarizes the peak current and voltage for compounds containing different anions.

Figures 33, 34:
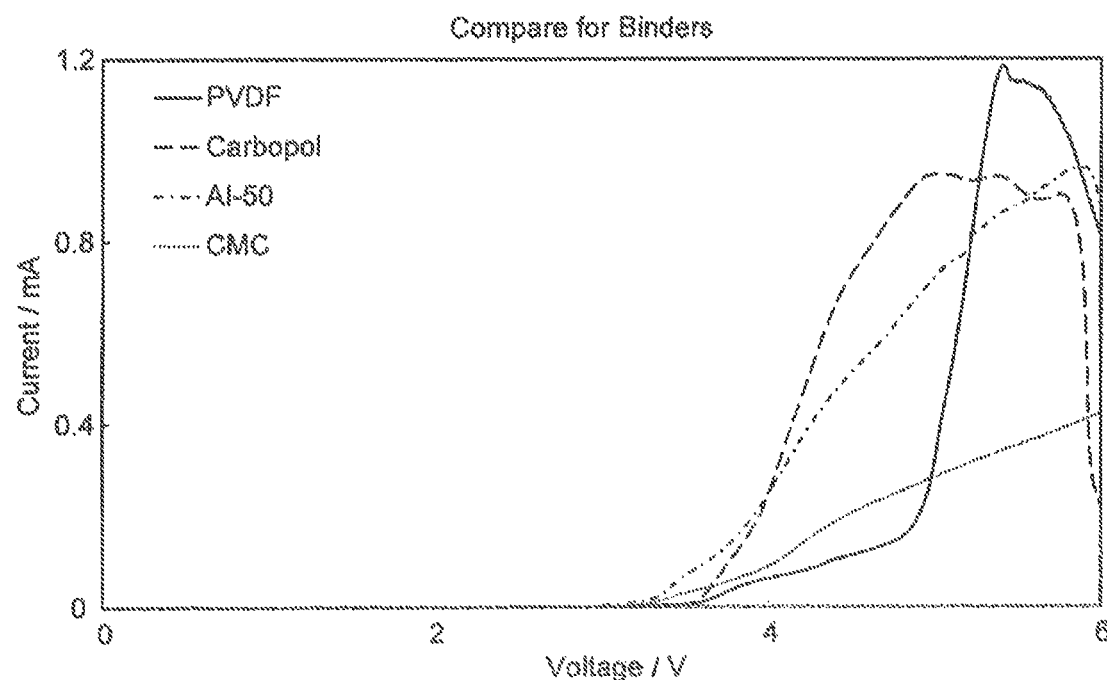

FIG. 33 illustrates the current profiles vs the voltage for the polymers (organic gas generators) with or without different anions for potential use in rechargeable batteries with different operation voltage. PVDF is included as the reference. The peak current and voltages are listed in FIG. 34. The peak current for Carbopol, AI-50 and PVDF were very similar while CMC was the lowest. The peak voltage of Carbopol was the lowest while the CMC peak voltage was the highest. Therefore, Carbopol containing $CO_3^{2-}$ anion maybe useful in lithium ion batteries with a relatively low operation voltage such as lithium ion cell using lithium iron phosphate positive electrode (3.7 V as the typical maximum charging voltage). CMC maybe useful in lithium ion batteries with a high operation voltage like lithium ion cell using the high voltage positive such as lithium cobalt oxide (4.2V as the typical maximum charging voltage) or lithium nickel cobalt manganese oxides (4.3 or 4.4V as the typical high charging voltage). Water is one of CMC decomposition compound and will react with the electrolyte and intercalated lithium in graphite negative to generate the gases such as hydrogen fluoride (HF) and oxygen ($O_2$) besides being vapor or gas above 100° C.

FIG. 34 summarizes the peak current and voltage for polymers with or without different anions.

DETAILED DESCRIPTION

Current Limiter

A first aspect of the disclosure is directed to an improved HEDR battery of a type including an anode energy layer 12, a cathode energy layer 14, a separator 2 between the anode energy layer 12 and the cathode energy layer 14 for preventing internal discharge thereof, and at least one current collector 4 for transferring electrons to and from either the anode or cathode energy layer. The anode and cathode energy layers each have an internal resistivity. The HEDR battery has a preferred temperature range for discharging electric current and an upper temperature safety limit. The improvement is employable, in the event of separator failure, for limiting the rate of internal discharge through the failed separator and the generation of joule heat resulting therefrom. More particularly, the improvement comprises a resistive layer 6 interposed between the separator and one of the current collectors 4 for limiting the rate of internal discharge through the failed separator in the event of separator failure. The resistive layer 6 has a fixed resistivity at temperatures between the preferred temperature range and the upper temperature safety limit. The fixed resistivity of the resistive layer 6 is greater than the internal resistivity of either energy layer. The resistive layer 6 helps the battery avoid temperatures in excess of the upper temperature safety limit in the event of separator failure.

Some embodiments of the present disclosure include an improved high energy density rechargeable battery are of a type including:
1. two electrodes (12 and 14) of opposite polarity, each electrode characterized by its resistivity, by its safe operating temperature range, and its safe charging voltage; the two electrodes being subject to a risk of overcharge above the safe charging voltage and the formation of the short circuit therefrom; the two electrodes being subject to a risk of thermal runaway above the safe operating temperature range.

2. a separator 2 for separating the two electrodes and preventing internal discharge therebetween; the separator being subject to a risk of forming a short circuit, the short circuit potentially allowing a rapid internal discharge between the two electrodes, the rapid internal discharge between the two electrodes potentially allowing a rapid production of joule heat therefrom, the rapid production of joule heat potentially allowing a thermal runaway.

3. at least one electrode employing a current collector 4 for transferring electrons.

4. a current limiter 6 forming an electrical coupling between one of the electrodes and its corresponding current collector, said current limiter having a resistivity for resistively impeding current therethrough and, in the event the separator forms the short circuit, for diverting current from the electrode current collector to which it is coupled, and for reducing the rate of the internal discharge between the two electrodes.

5. a current interrupter 8 having an engaged configuration, an disengaged configuration, and a gas generating component for transitioning said current interrupter from the engaged to the unengaged configuration, the gas generating component having a trigger for generating a gas, the trigger being selected from the group consisting of temperature triggers and voltage triggers, the temperature triggers being activatable above the safe operating temperature range; the voltage triggers being activatable above the safe charging voltage; in the engaged configuration, said current interrupter electrically coupling one of the electrodes and its corresponding current collector with a laminated connection, in the disengaged configuration, the laminated connection becoming delaminated and said current interrupter forming a nonconductive gap for interrupting the electrical coupling between the electrode and its corresponding current collector, said current interrupter transitioning from the engaged to the disengaged configuration by triggering the gas generating component responsive to the trigger, the generated gas delaminating the laminated connection for interrupting the electrical coupling between the electrode and its corresponding current collector, whereby said current limiter and said current interrupter, in combination, diminishing the risk of thermal runaway resulting from separator short circuit, electrode overcharge, and electrode overheating.

In some embodiments, the current interrupter is triggered by temperature.

In some embodiments, the current interrupter includes a layer containing a single gas generating component triggered by temperature.

In some embodiments, the current interrupter is triggered by voltage.

In some embodiments, the current interrupter includes a layer containing a single gas generating component triggered by voltage.

In some embodiments, the current interrupter is triggered by temperature and voltage.

In some embodiments, the current interrupter includes a layer containing a single gas generating component triggered by temperature and voltage.

In some embodiments, the current interrupter includes a layer containing two gas generating components, one triggered by temperature and the other triggered by voltage.

In some embodiments, the current interrupter may include a layer containing one or more inorganic gas generating compounds that generate gas at a specific temperature or voltage.

In some embodiments, the inorganic gas generating compounds are selected from the group consisting of $CaCO_3$, $La_2(CO_3)_3$, $Na_2SO_3$, $ZnCO_3Zn(OH)_2$, $CuCO_3Cu(OH)_2$, and $Cu(NO_3)_2$ as disclosed in FIG. 32.

In some embodiments, the current interrupter may include a layer containing one or more organic gas generating compounds that generate gas at a specific temperature or voltage.

In some embodiments, the organic gas generating compounds are selected from the group consisting of Carbopol, Torlon® AI-50, CMC, and PVDF as disclosed in FIG. 34.

In some embodiments, the current interrupter may include a layer containing a combination of inorganic and organic gas generating compounds that generate gas at a specific temperature or voltage.

Figure 1A:
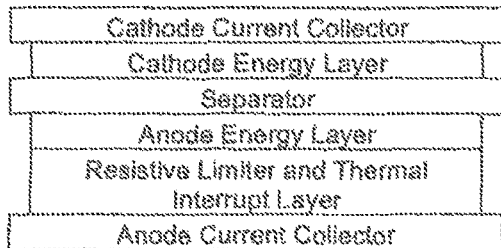
Figure 1E:
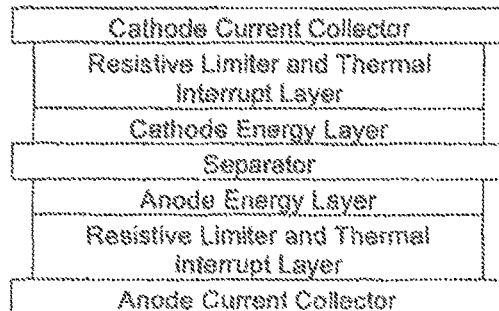
Figure 1B:
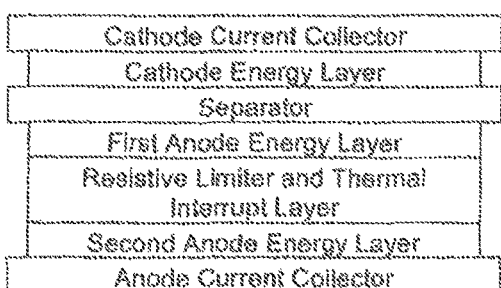
Figure 1F:
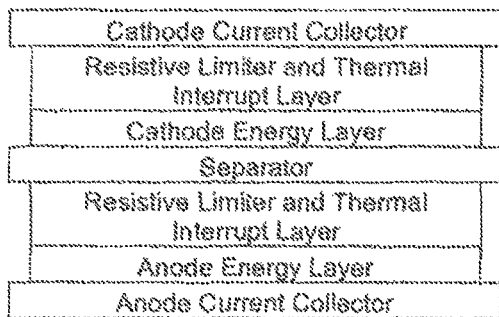
Figure 1C:
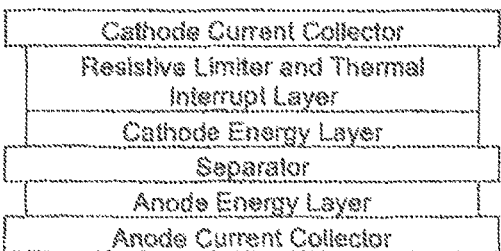

In some embodiments of the improved high energy density rechargeable battery, said current limiter and said current interrupter are simultaneously incorporated into a protective layer interposed by lamination between the same electrode and current collector, as disclosed in FIGS. 1A, 1C, and 2A.

In some embodiments of the improved high energy density rechargeable battery, said current limiter and said current interrupter triggered by both temperature and voltage are simultaneously incorporated into a protective layer interposed by lamination between the same electrode and current collector, as disclosed in FIG. 3A.

In some embodiments, the improved high energy density rechargeable battery is of a type having two current collectors, including a first current collector and a second current collector, the two electrodes including a first electrode and a second electrode, the improvement further characterized wherein:

said current limiter and said current interrupter are simultaneously incorporated into a first protective layer interposed by lamination between the first electrode and the first current collector; and said current limiter and said current interrupter are simultaneously incorporated into a second protective layer interposed by lamination between the second electrode and the second current collector, as disclosed in FIG. 1E.

In some embodiments, the improved high energy density rechargeable battery is of a type having two current collectors, including a first current collector and a second current collector, the two electrodes including a first electrode and a second electrode, the improvement further characterized wherein:

said current limiter and said current interrupter are simultaneously incorporated into a first protective layer interposed by lamination between the first electrode and the first current collector; and said current limiter and said current interrupter are simultaneously incorporated into a second protective layer interposed by lamination between the second electrode and the separator, as disclosed in FIG. 1F.

Figure 1G:
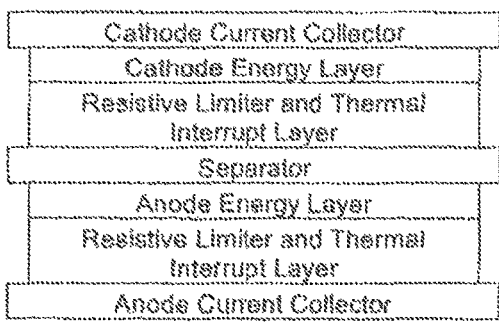

In some embodiments, the improved high energy density rechargeable battery is of a type having two current collectors, including a first current collector and a second current collector, the two electrodes including a first electrode and a second electrode, the improvement further characterized wherein:

said current limiter and said current interrupter are simultaneously incorporated into a first protective layer interposed by lamination between the first electrode and the separator; and said current limiter and said current interrupter are simultaneously incorporated into a second protective layer interposed by lamination between the second electrode and the second current collector, as disclosed in FIG. 1G.

In some embodiments, the improved high energy density rechargeable battery is of a type having two current collectors, including a first current collector and a second current collector, the two electrodes including a first electrode and a second electrode, and the first electrode including a first portion and a second portion, the second portion of the first electrode interposed between the first portion of the first electrode and the first current collector, the improvement further characterized wherein:

1. said current limiter being layered between the first portion of the first electrode and the second portion of the first electrode; and
2. said current interrupter being layered between the second portion of the first electrode and the first current collector.

In some embodiments, the improved high energy density rechargeable battery is of a type having two current collectors, including a first current collector and a second current collector, the two electrodes including a first electrode and a second electrode, and the first electrode including a first portion and a second portion, the second portion of the first electrode interposed between the first portion of the first electrode and the first current collector, the improvement further characterized, wherein said current limiter and said current interrupter are simultaneously incorporated into a protective layer interposed by lamination between the first portion and the second portion of the first electrode, as disclosed in FIGS. 1B and 2B.

In some embodiments, the improved high energy density rechargeable battery is of a type having two current collectors, including a first current collector and a second current collector, the two electrodes including a first electrode and a second electrode, and the first electrode including a first portion and a second portion, the second portion of the first electrode interposed between the first portion of the first electrode and the first current collector, the improvement further characterized, wherein said current limiter and said current interrupter triggered by both temperature and voltage are simultaneously incorporated into a protective layer interposed by lamination between the first portion and the second portion of the first electrode, as disclosed in FIG. 3B.

In some embodiments, the improved high energy density rechargeable battery is of a type having two current collectors, including a first current collector and a second current collector, the two electrodes including a first electrode and a second electrode, and the second electrode including a first portion and a second portion, the first portion of the second electrode interposed between the second portion of the second electrode and the second current collector, the improvement further characterized wherein:

1. said current limiter being layered between the first portion of the second electrode and the second portion of the second electrode; and
2. said current interrupter being layered between the second portion of the second electrode and the second current collector.

In some embodiments, the improved high energy density rechargeable battery is of a type having two current collectors, including a first current collector and a second current collector, the two electrodes including a first electrode and a second electrode, and the second electrode including a first portion and a second portion, the first portion of the second electrode interposed between the second portion of the second electrode and the second current collector, the improvement further characterized wherein:

1. said current interrupter being layered between the first portion of the second electrode and the second portion of the second electrode; and
2. said current limiter being layered between the second portion of the second electrode and the second current collector.

Figure 1D:
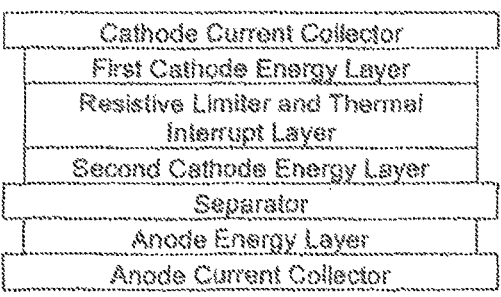

In some embodiments, the improved high energy density rechargeable battery is of a type having two current collectors, including a first current collector and a second current collector, the two electrodes including a first electrode and a second electrode, and the first electrode including a first portion and a second portion, the first portion of the second electrode interposed between the second portion of the second electrode and the second current collector, the improvement further characterized, wherein said current limiter and said current interrupter are simultaneously incorporated into a protective layer interposed by lamination between the first portion and the second portion of the second electrode, as disclosed in FIG. 1D.

In some embodiments, the improved high energy density rechargeable battery is of a type having two current collectors, including a first current collector and a second current collector, the two electrodes including a first electrode and a second electrode, and the first electrode including a first portion and a second portion, the second portion of the first electrode interposed between the first portion of the first electrode and the first current collector, the improvement further characterized wherein:

1. said current limiter being layered between the second portion of the first electrode and the first current collector; and
2. said current interrupter being layered between the first portion of the first electrode and the second portion of the first electrode.

In some embodiments, the improved high energy density rechargeable battery is of a type having two current collectors, including a first current collector and a second current collector and the two electrodes including a first electrode and a second electrode, the improvement further characterized, wherein:

1. said current limiter being layered between the first electrode and the first current collector; and
2. said current interrupter being layered between the second electrode and the second current collector.

In some embodiments, the improved high energy density rechargeable battery is of a type, wherein each electrode has a temperature range for safe operation and an internal resistivity therein, the improvement further characterized wherein said current limiter having a resistivity greater than the internal resistivity of the electrode with which said current limiter is layered within the temperature range for safe operation.

In some embodiments of the improved high energy density rechargeable battery, the improvement further characterized, wherein said current limiter lacking a resistivity transition switch at temperatures within the temperature range for safe operation.

In some embodiments, the improved high energy density rechargeable battery is of a type, wherein each electrode has a temperature range for standard operation, the improvement further characterized, wherein said current limiter having a resistivity transition with a resistivity less than the internal resistivity of the electrode within the temperature range for standard operation and a resistivity greater than the internal resistivity of the electrode above the temperature range for standard operation.

In some embodiments, the improved high energy density rechargeable battery is of a type, wherein each electrode has a temperature range for standard operation, the improvement further characterized, wherein said current interrupter is activated by temperature above the temperature range for standard operation.

In some embodiments, the improved high energy density rechargeable battery is of a type, wherein each electrode has a temperature range for standard operation and a temperature range for safe operation, the improvement further characterized, wherein said current interrupter is activated by temperature above the temperature range for standard operation and within the temperature range for safe operation.

In some embodiments, the improved high energy density rechargeable battery is of a type, wherein each electrode has an internal resistivity within the temperature range for safe operation, the improvement further characterized, wherein said current limiter having a resistivity greater than the internal resistivity of the electrode with which said current limiter is layered within the temperature range for safe operation.

In some embodiments of the improved high energy density rechargeable battery, the improvement further characterized, wherein said current limiter and said current interrupter are simultaneously incorporated into a protective layer interposed by lamination between the same electrode and current collector.

In some embodiments, the improved high energy density rechargeable battery is of a type, wherein each electrode has a voltage range for standard operation, the improvement further characterized, wherein said current interrupter is activated by voltage above the voltage range for standard operation.

In some embodiments, the improved high energy density rechargeable battery is of a type, wherein each electrode has a voltage range for standard operation and a voltage range for safe operation, the improvement further characterized, wherein said current interrupter is activated by voltage above the temperature range for standard operation and within the voltage range for safe operation.

In some embodiments of the improved high energy density rechargeable battery, the improvement further characterized, wherein said current limiter and said current interrupter are simultaneously incorporated into a protective layer interposed by lamination between the same electrode and current collector.

Other embodiments of the present disclosure include an improved high energy density rechargeable battery of a type including two electrodes of opposite polarity, a separator separating the two electrodes, and at least one current collector electrically coupled to one of the electrodes, the separator preventing internal discharge between the two electrodes, failure of the separator potentially causing an internal discharge between the two electrodes (as illustrated in FIGS. 6A-B and FIGS. 7A-B), the internal discharge causing a generation of joule heat of potential danger, the improvement comprising:

1. a thermally activatable current interrupter and a voltage activatable current interrupter, wherein said thermally activatable current interrupter layered by lamination between one of the current collectors and one of the electrodes, said thermally activatable current interrupter, when unactivated, electrically coupling the current collector to the electrode with which it is layered, said current interrupter, when activated, delaminating from the current collector for forming a nonconductive gap for electrically decoupling the current collector from the electrode with which it had been layered (as illustrated in FIGS. 6C-D and FIGS. 7C-D), the electrical decoupling slowing the rate of internal discharge between the two electrodes in the event of separator failure;

2. said voltage activatable current interrupter layered by lamination between one of the current collectors and one of the electrodes, said voltage activatable current interrupter, when unactivated, electrically coupling the current collector to the electrode with which it is layered, said current interrupter, when activated, delaminating from the current collector for forming a nonconductive gap for electrically decoupling the current collector from the electrode with which it had been layered, the electrical decoupling slowing the rate of internal discharge between the two electrodes in the event of separator failure (as illustrated in FIGS. 6C-D and FIGS. 7C-D);

whereby, activation of either said thermally activated current interrupter or voltage activated current interrupter in the event of separator failure, slows the generation joule heat for diminishing the potential danger.

Some embodiments of the present disclosure include a process for avoiding thermal runaway within a high energy density rechargeable battery undergoing internal discharge due to separator failure, the process comprising delaminating an electrode within the battery from its current collector by generating a gas from a heat sensitive gas generating material within an interrupt layer interposed between the electrode and current collector, said delaminating electrically decoupling the electrode from its current collector for slowing the rate of internal discharge.

Some embodiments of the present disclosure include a process for avoiding thermal runaway within a high energy density rechargeable battery at risk of suffering from separator failure due to voltage overcharge (as illustrated in FIGS. 7A-B), the process comprising delaminating an electrode within the battery from its current collector by generating a gas from a voltage sensitive gas generating material within an interrupt layer interposed between the electrode and current collector, said delaminating electrically decoupling the electrode from its current collector for interrupting the voltage overcharge (as illustrated in FIGS. 7C-D).

Definitions

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

As used herein, "high energy density rechargeable (HEDR) battery" means a battery capable of storing relatively large amounts of electrical energy per unit weight on the order of about 50 W-hr/kg or greater and is designed for reuse, and is capable of being recharged after repeated uses. Non-limiting examples of HEDR batteries include metal-ion batteries and metallic batteries.

As used herein, "metal-ion batteries" means any rechargeable battery types in which metal ions move from the negative electrode to the positive electrode during discharge and back when charging. Non-limiting examples of metal-ion batteries include lithium-ion, aluminum-ion, potassium-ion, sodium-ion, magnesium-ion, and others.

As used herein, "metallic batteries" means any rechargeable battery types in which the anode is a metal or metal alloy. The anode can be solid or liquid. Metal ions move from the negative electrode to the positive electrode during discharge and back when charging. Non-limiting examples of metallic batteries include M-S, M-NiCl$_2$, M-V$_2$O$_5$, M-Ag2VP2O8, M-TiS$_2$, M-TiO$_2$, M-MnO$_2$, M-Mo$_3$S$_4$, M-MoS$_6$Se$_2$, M-MoS$_2$, M-MgCoSiO$_4$, M-Mg$_{1.03}$Mn$_{0.97}$SiO$_4$, and others, where M=Li, Na, K, Mg, Al, or Zn.

As used herein, "lithium-ion battery" means any rechargeable battery types in which lithium ions move from the negative electrode to the positive electrode during discharge and back when charging. Non-limiting examples of lithium-ion batteries include lithium cobalt oxide (LiCoO$_2$), lithium iron phosphate (LiFePO$_4$), lithium cobalt phosphate (LiCoPO$_4$), lithium excess layered oxides such as (LiMnO$_3$) x(LiMO$_2$) (M=Ni, Co, Mn), olivines, LiMSiO$_4$ (M=iron, Cobalt, Nickel and Vanadium); lithium manganese oxide (LiMn$_2$O$_4$), lithium nickel oxide (LiNiO$_2$), lithium nickel manganese cobalt oxide (LiNiMnCoO$_2$), lithium nickel cobalt aluminum oxide (LiNiCoAlO$_2$), lithium titanate (Li$_4$Ti$_5$O$_{12}$), lithium titanium dioxide, lithium/graphene, lithium/graphene oxide coated sulfur, lithium-sulfur, lithium-purpurin, and others. Lithium-ion batteries can also come with a variety of anodes including silicon-carbon nanocomposite anodes and others. Lithium-ion batteries can be in various shapes including small cylindrical (solid body without terminals), large cylindrical (solid body with large threaded terminals), prismatic (semi-hard plastic case with large threaded terminals), and pouch (soft, flat body). Lithium polymer batteries can be in a soft package or pouch. The electrolytes in these batteries can be a liquid electrolyte (such as carbonate based or ionic), a solid electrolyte, a polymer based electrolyte or a mixture of these electrolytes.

As used herein, "aluminum-ion battery" means any rechargeable battery types in which aluminum ions move from the negative electrode to the positive electrode during discharge and back when charging. Non-limiting examples of aluminum-ion batteries include Al$_n$M$_2$(XO$_4$)$_3$, wherein X=Si, P, S, Mo, As, and others; and M=Fe, Ca, Mg, V, Cr and others; aluminum transition-metal oxides (Al$_x$MO$_2$ wherein M=Fe, Mn, Ni, Mo, Co, Cr, Ti, V and others) such as Al$_x$(V$_4$O$_8$), Al$_x$NiS$_2$, Al$_x$FeS$_2$, Al$_x$VS$_2$ and Al$_x$WS$_2$ and others.

As used herein, "potassium-ion battery" means any rechargeable battery types in which potassium ions move from the negative electrode to the positive electrode during discharge and back when charging. Non-limiting examples of potassium-ion batteries include K$_n$M$_2$(XO$_4$)$_3$, wherein X=Si, P, S, Mo, As, and others; and M=Fe, Ca, Mg, V, Cr and others; potassium transition-metal oxides (KMO$_2$ wherein M=Fe, Mn, Ni, Mo, Co, Cr, Ti, V and others), and others.

As used herein, "sodium-ion battery" means any rechargeable battery types in which sodium ions move from the negative electrode to the positive electrode during discharge and back when charging. Non-limiting examples of sodium-ion batteries include Na$_n$M$_2$(XO$_4$)$_3$, wherein X=Si, P, S, Mo, As, and others; and M=Fe, Ca, Mg, V, Cr and others; NaV$_{1-x}$Cr$_x$PO$_4$F, NaVPO$_4$F, Na$_4$Fe$_3$(PO$_4$)$_2$(P$_2$O$_7$), Na$_2$FePO$_4$F, Na$_2$FeP$_2$O$_7$, Na$_{2/3}$[Fe$_{1/2}$Mn$_{1/2}$]O$_2$, Na(Ni$_{1/3}$Fe$_{1/3}$Mn$_{1/3}$)O$_2$, NaTiS$_2$, NaFeF$_3$; Sodium Transition-Metal Oxides (NaMO$_2$ wherein M=Fe, Mn, Ni, Mo, Co, Cr, Ti, V and others) such as Na$_{2/3}$[Fe$_{1/2}$Mn$_{1/2}$]O$_2$, Na(Ni$_{1/3}$Fe$_{1/3}$Mn$_{1/3}$)O$_2$, Na$_x$M$_{o2}$O$_4$, NaFeO$_2$, Na$_{0.7}$CoO$_2$, NaCrO$_2$, NaMnO$_2$, Na$_{0.44}$MnO$_2$, Na$_{0.7}$MnO$_2$, Na$_{0.7}$MnO$_{2.25}$, Na$_{2/3}$Mn$_{2/3}$Ni$_{1/3}$O$_2$, Na$_{0.6}$1 Ti$_{0.48}$Mn$_{0.52}$O$_2$; Vanadium Oxides such as Na$_{1+x}$V$_3$O$_8$, Na$_x$V$_2$O$_5$, and Na$_x$VO$_2$ (x=0.7, 1); and others.

As used herein, "magnesium-ion battery" means any rechargeable battery types in which magnesium ions move from the negative electrode to the positive electrode during discharge and back when charging. Non-limiting examples of magnesium-ion batteries include Mg$_n$M$_2$(XO$_4$)$_3$, wherein X=Si, P, S, Mo, As, and others; and M=Fe, Ca, Mg, V, Cr and others; magnesium Transition-Metal Oxides (MgMO$_2$ wherein M=Fe, Mn, Ni, Mo, Co, Cr, Ti, V and others), and others.

As used herein, "silicon-ion battery" means any rechargeable battery types in which silicon ions move from the negative electrode to the positive electrode during discharge and back when charging. Non-limiting examples of silicon-ion batteries include Si$_n$M$_2$(XO$_4$)$_3$, wherein X=Si, P, S, Mo, As, and others; and M=Fe, Ca, Mg, V, Cr and others; Silicon Transition-Metal Oxides (SiMO$_2$ wherein M=Fe, Mn, Ni, Mo, Co, Cr, Ti, V and others), and others.

As used herein, "binder" means any material that provides mechanical adhesion and ductility with inexhaustible tolerance of large volume change. Non-limiting examples of binders include styrene butadiene rubber (SBR)-based binders, polyvinylidene fluoride (PVDF)-based binders, carboxymethyl cellulose (CMC)-based binders, poly(acrylic acid) (PAA)-based binders, polyvinyl acids (PVA)-based binders, poly(vinylpyrrolidone) (PVP)-based binders, and others.

As used herein, "conductive additive" means any substance that increases the conductivity of the material. Non-limiting examples of conductive additives include carbon black additives, graphite nonaqueous ultrafine carbon (UFC) suspensions, carbon nanotube composite (CNT) additives (single and multi-wall), carbon nano-onion (CNO) additives, graphene-based additives, reduced graphene oxide (rGO), conductive acetylene black (AB), conductive poly (3-methylthiophene) (PMT), filamentary nickel powder additives, aluminum powder, and others.

As used herein, "metal foil" means any metal foil that under high voltage is stable. Non-limiting examples of metal foils include aluminum foil, copper foil, titanium foil, steel foil, nano-carbon paper, graphene paper, carbon fiber sheet, and others.

As used herein, "ceramic powder" means any electrical insulator or electrical conductor that hasn't been fired. Non-limiting examples of ceramic powder materials include barium titanate (BaTiO$_3$), zirconium barium titanate, strontium titanate (SrTiO$_3$), calcium titanate (CaTiO$_3$), magnesium titanate (MgTiO$_3$), calcium magnesium titanate, zinc titanate (ZnTiO$_3$), lanthanum titanate (LaTiO$_3$), and neodymium titanate (Nd$_2$Ti$_2$O$_7$), barium zirconate (BaZrO$_3$), calcium zirconate (CaZrO$_3$), lead magnesium niobate, lead zinc niobate, lithium niobate (LiNbO$_3$), barium stannate (BaSnO$_3$), calcium stannate (CaSnO$_3$), magnesium aluminum silicate, sodium silicate (NaSiO$_3$), magnesium silicate (MgSiO$_3$), barium tantalate (BaTa$_2$O$_6$), niobium oxide, zirconium tin titanate, silicon dioxide (SiO$_2$), aluminum oxide (Al$_2$O$_3$), titanium dioxide (TiO$_2$), and others.

As used herein, "gas generator material" means any material which will decompose at the high temperature or high voltage to produce a gas either directing from the gas generator material or indirectly from reaction of the decomposition products produced from the gas generator material with other materials contained within the battery (e.g. the electrolyte and electrodes). Non-limiting examples of gas generator materials include inorganic carbonates such as $M_n(CO_3)_m$, $M_n(SO_3)_m$, $M_n(NO_3)_m$, $^1M_n{}^2M_n(CO_3)_m$, $NaSiO_3*H_2O$, $CuCO_3CU(OH)_2$, and others and organic carbonates such as polymethacrylic $[-CH_2-C(CH_3)(COOM)-]_p$ and polyacrylate salts $[-CH_2-CH(COOM)-]_p$, and others wherein M, $^1M$, $^2M$ are independently selected from the group consisting of Ba, Ca, Cd, Co, Cu, Fe, K, Li, Mg, Mn, Na, Ni, Pb, Sr, and Zn; n is 1-3 and m is 1-4. In some embodiments, M is independently selected from the group consisting of an ammonium ion, pyridinium ion and a quaternary ammonium ion. In some embodiments, the gas generator material may decompose to produce a liquid (e.g. water). The liquid may react with other materials contained within the battery to form a gas and this gas will delaminate the electrode. (E.g. water reacting with the electrolyte [$LiFP_6$] to form gaseous HF and lithium in the negative to form hydrogen gas ($H_2$). If the temperature of the cell exceeds the vaporization temperature of the liquid, the liquid may also undergo a phase transition to form a gas and this gas will also delaminate the electrode.

Layers were coated onto metal foils by an automatic coating machine (compact coater, model number 3R250W-2D) produced by Thank-Metal Co., Ltd. Layers are then compressed to the desired thickness using a calender machine (model number X15-300-1-DZ) produced by Beijing Sevenstar Huachuang Electronics Co., Ltd.

EXAMPLES

The disclosure will be described more in detail below using examples, but the disclosure is not limited to the examples shown below.

The following abbreviations have the indicated meanings:
Carbopol®-934=cross-linked polyacrylate polymer supplied by Lubrizol Advanced Materials, Inc.
CMC=carboxymethyl cellulose
CMC-DN-800H=CMC whose sodium salt of the carboxymethyl group had been replaced by ammonium (supplied by Daicel FineChem Ltd).
MCMB=mesocarbon microbeads
NMC=Nickel, Manganese and Cobalt
NMP=N-methylpyrrolidone
PTC=positive temperature coefficient
PVDF=polyvinylidene fluoride
SBR=styrene butadiene rubber
Super P®=conductive carbon blacks supplied by Timcal
Torlon® AI-50=water soluble analog of Torlon® 4000TF
Torlon® 4000TF=neat resin polyamide-imide (PAI) fine powder Resistance layer and electrode active layer preparation and cell assembly.

Generic example of a resistance layer preparation steps (first layer):
  i. Dissolve the binder into an appropriate solvent.
  ii. Add the conductive additive and ceramic powder into the binder solution to form a slurry.
  iii. Coat the slurry made in Step ii. onto the surface of a metal foil, and then dry it to form a resistance layer on the surface of the foil.

Generic example of the electrode preparation (on the top of the first layer):
  iv. Dissolve the binder into an appropriate solvent.
  v. Add the conductive additive into the binder solution to form a slurry.
  vi. Put the cathode or anode material into the slurry made in the Step v. and mix it to form the slurry for the electrode coating.
  vii. Coat the electrode slurry made in the Step vi. onto the surface of the layer from Step iii.
  viii. Compress the electrode into the design thickness.

Cell assembly:
  ix. Dry the positive electrode at 125° C. for 10 hr and negative electrode at 140° C. for 10 hr.
  x. Punch the electrodes into the pieces with the electrode tab.
  xi. Laminate the positive and negative electrodes with the separator as the middle layer.
  xii. Put the flat jelly-roll made in the Step xi. into the Aluminium composite bag.

Impact test (See FIG. 21):
  i. Charge the cell at 2 A and 4.2V for 3 hr.
  ii. Put the cell onto a hard flat surface such as concrete.
  iii. Attach a thermal couple to the surface of the cell with high temperature tape and connect the positive and negative tabs to the voltage meter.
  iv. Place a steel rod (15.8 mm±0.1 mm in diameter X about 70 mm long) on its side across the center of the cell.
  v. Suspend a 9.1±0.46 Kg steel block (75 mm in diameter X 290 mm high) at a height of 610±25 mm above the cell.
  vi. Using a containment tube (8 cm inside diameter) to guide the steel block, release the steel block through the tube and allow it to free fall onto the steel bar laying on the surface of the cell causing the separator to breach while recording the temperature.
  vii. Leave the steel rod and steel block on the surface of the cell until the cell temperature stabilizes near room temperature.
  viii. End test.

Overcharge Test.
  i. Charge the cell at 2 A and 4.2V for 3 hr.
  ii. Put the charged cell into a room temperature oven.
  iii. Connect the cell to a power supply (manufactured by Hewlett-Packard).
  iv. Set the voltage and current on the power supply to 12V and 2 A.
  v. Turn on the power supply to start the overcharge test while recording the temperature and voltage.
  vi. Test ends when the cell temperature decreases and stabilizes near room temperature.

Resistance (Thermal) Measurement Test.
  i. Place one squared copper paper (4.2×2.8 cm) on the black ceramic top (4.2×2.8 cm). Then cut a piece of thermal tape and carefully cover the squared copper paper.
  ii. Cut another piece of thermal tape and cover the rest of the squared copper paper. Make sure the metal flat strip is facing the tape.
  iii. Place another copper paper with metal strip on the other side, repeat steps i-ii with it. At this point, carefully stick them together and get rid of any air bubble within the strip.

iv. Carefully cover half of the metal strip with thermal tape. Repeat on other side as well.
v. Cut a "V" shaped piece of metal off both metal strips.
vi. Attach the completed strip to the metal clamp and tighten the screws. Make the sure the screws are really tight.
vii. Attach the metal clamp to the Battery HiTester (produced by Hioki USA Corp.) to determine the resistance and then make a record of it.
viii. Attach the metal clamp inside the oven, connect the "V" shaped metal strips to each side and then tightened the screw. Tape the temperature test wire onto the metal clamp.
ix. Attach the Battery HiTester to the oven's wire. Do not mix up the positive and the negative wires.
x. Close the oven and set the temperature to 200° C. Press start in the excel sheet to record data every 15 seconds.
xi. Stop recording the data when the metal clamp and oven reach just a little over 200° C.
xii. Turn off the oven and the Battery HiTester.
xiii. End Test.

Cycle Life procedure.
i. Rest for 5 minutes.
ii. Discharge to 2.8V at 1 A.
iii. Rest for 20 minutes.
iv. Charge to 4.2V at 0.7 A for 270 minutes.
v. Rest for 10 minutes.
vi. Discharge to 2.8V at 0.7 A.
vii. Rest for 10 minutes.
viii. Repeat Steps iii to vii 100 times.
ix. End test.

Discharge test at 1 A, 3 A, 6 A, 10 A.
The cell was tested in a chamber with a temperature control to 50° C.
i. Rest for 5 minutes.
ii. Discharge to 2.8V at 1 A.
iii. Rest for 20 minutes.
iv. Charge to 4.2V at 0.7 A for 270 minutes.
v. Rest for 10 minutes.
vi. Discharge to 2.8V at 1 A.
vii. Rest for 10 minutes.
viii. Charge to 4.2V at 0.7 A for 270 minutes.
ix. Rest for 10 minutes.
x. Discharge to 2.8V at 3 A.
xi. Charge to 4.2V at 0.7 A for 270 minutes.
xii. Rest for 10 minutes.
xiii. Discharge to 2.8V at 6 A.
xiv. Charge to 4.2V at 0.7 A for 270 minutes.
xv. Rest for 10 minutes.
xvi. Discharge to 2.8V at 10 A.
xvii. Rest for 10 minutes.
xviii. End Test.

Example 1

Preparation of Baseline Electrodes, Positive and Negative Electrodes, and the Completed Cell #1 for the Evaluation in the Resistance Measurement, Discharge Capability Tests at 50° C., Impact Test, and Cycle Life Test A) Preparation of POS 1a as an Example of the Positive Electrode Preparation.
i) Dissolve PVDF (21.6 g) into NMP (250 g); ii) Add carbon black (18 g) and mix for 15 minutes at 6500 rpm; iii) Add $LiNi_{0.5}Mn_{0.3}Co_{0.2}O_2$ (NMC) (560.4 g) to the slurry from Step ii and mix for 30 minutes at 6500 rpm to form a flowable slurry; iv) Some NMP may be added for the viscosity adjustment; v) Coat this slurry onto 15 ☐Coat this slurry onto 15 the viscosity adjustment; e slurry; pability tests at 50eted Cell ° C. and the second heat zone to about 130° C. to evaporate off the NMP. The final dried solid loading is about 15.55 mg/cm². The positive layer was then compressed to a thickness of about 117 p.m. The electrode made here is called as zero voltage against graphite electrode and is ready for the impedance measurement at 0 V in relation to the temperature, and the dry for the cell assembly.

B) Preparation of NEG2 A as an example of the negative electrode preparation
i) Dissolve CMC (5.2 g) into deionized water (~300 g); ii) Add carbon black (8.4 g) and mix for 15 minutes at 6500 rpm; iii) Add negative active graphite (JFE Chemical Corporation; Graphitized Mesophase Carbon Micro Bead (MCMB) and Synthetic Graphite (TIMCAL) (378.4 g in total) to the slurry from Step ii and mix for 30 minutes at 6500 rpm to form a flowable slurry; iv) Add SBR (solid content 50% suspended in water) (16.8 g) to the slurry formed in Step iii and mix at 6500 rpm for 5 min; v) Adjust the viscosity for a smooth coating; vi) Coat this slurry onto 9☐ Coat this slurry onto 9 a smooth coating; r) (16.8 g) to the slurry formed in Step Bead (MCM° C. and the second heat zone to about 100° C. to evaporate off the water. The final dried solid loading is about 9.14 mg/cm². The negative electrode layer was then compressed to a thickness of about 117 p.m. The negative made is ready for the dry for the cell assembly.

C) Preparation of Cell for the Evaluation
i) Punch the electrodes into the pieces with the electrode tab; ii) Dry the positive electrode at 125° C. for 10 hr and negative electrode at 140° C. for 10 hr; iii) Laminate the positive and negative electrodes with the separator as the middle layer; iv) Put the flat jelly-roll made in the Step iii. into the Aluminium composite bag; v) Dry the bag from Step iv. in a 70° C. vacuum oven; vi) Fill the bag from Step v with the $LiPF_6$ containing organic carbonate based electrolyte; vii) Seal the bag from Step vi; viii) Rest for 16 hours; viiii) Charge the cell to 4.2V at C/20 rate for 5 hours and then to 4.2V at 0.5 C rate for 2 hours, then rest for 20 minutes, then discharge to 2.8V at 0.5 C rate. Under vacuum, puncture the cell to release any gases and then reseal the cell. The cell made here is ready for grading and other tests such as discharging capability test at 50° C., impact test, cycle life test and so on.

FIG. 15 presents the resistance in relation to the temperature increase for the positive electrode collected from autopsying a cell with 3.6 V. The resistance decreases about ten times. FIG. 18 shows the discharge capacity at the discharging currents 1, 3, 6, 10 A. FIG. 20 lists the cell impedance at 1 kHz and the capacity at 1 A, 3 A, 6 A and 10 A currents and the ratio of the capacity at 3, 6, 10 A over that at 1 A. FIG. 22 shows the cell temperature profile during the impact test. FIG. 23 summarizes the cell maximum temperature in the impact test. The cell caught the fire during the impact test. FIG. 25 shows the voltage and temperature profiles of the cells during the 12V/2 A over charge test. The cell caught the fire during the over charge test (FIG. 28).

Example 2

Preparation of $CaCO_3$ Based Gas Generator and Resistive Layer, Positive and Negative Electrodes, and the Completed Cell #3 for the Evaluation in the Resistance Measurement, Discharge Capability Tests at 50° C., Impact Test, Over Charge, and Cycle Life Test A) Positive POS3B as an Example of a Gas Generator and Resistive Layer (1$^{st}$ Layer) Preparation.

i) Dissolve Torlon 4000TF (0.8 g) into NMP (10 g); ii) Dissolve PVDF (4.8 g) into NMP (~70 g); iii) Mix solution prepared in Step i and ii, and then add carbon black (0.32 g) and mix for 10 minutes at 6500 rpm; iv) Add nano CaCO$_3$ powder (34.08 g) to the solution from Step iii and mix for 20 minutes at 6500 rpm to form a flowable slurry; v) Coat this slurry onto 15 □Coat this slurry onto 15 6500 rpm to form a flowable slurry; 6500 rpm; sts at 50 completed Cell #° C. and the second heat zone to about 165° C. to evaporate off the NMP. The final dried solid loading is about 1 mg/cm$^2$.

B) Preparation of POS3 A as an Example of the Positive Electrode Preparation (2$^{nd}$ Layer).

i) Dissolve PVDF (21.6 g) into NMP (250 g); ii) Add carbon black (18 g) and mix for 15 minutes at 6500 rpm; iii) Add LiNi$_{1/3}$Co$_{1/3}$Mn$_{1/3}$O$_2$ (NMC) (560.4 g) to the slurry from Step ii and mix for 30 minutes at 6500 rpm to form a flowable slurry; iv) Some NMP may be added for the viscosity adjustment; v) Coat this slurry onto POS3B (Example 2 A) using an automatic coating machine with the first heat zone set to about 85° and the second heat zone to about 135° C. to evaporate off the NMP. The final dried solid loading is about 19.4 mg/cm$^2$. The positive layer was then compressed to a thickness of about 153 µm. The electrode made here is called as zero voltage against graphite electrode and is ready for the impedance measurement at 0 V in relation to the temperature.

C) Preparation of NEG3 A as an Example of the Negative Electrode Preparation i) Dissolve CMC (13 g) into deionized water (1000 g); ii) Add carbon black (20 g) and mix for 15 minutes at the rate of about 6500 rpm; iii) Add negative active graphite (JFE Chemical Corporation; Graphitized Mesophase Carbon Micro Bead (MCMB) and Synthetic Graphite (TIMCAL) (945.92 g in total) to the slurry from Step ii and mix for 30 minutes at 6500 rpm to form a flowable slurry; iv) Add SBR (solid content 50% suspended in water) (42 g) to the slurry formed in Step iii and mix at 6500 rpm for 5 min; v) Adjust the viscosity for a smooth coating; vi) Coat this slurry onto 9 □ Coat this slurry onto 9 a smooth coating; er) (42 g) to the slurry formed in Step act=8&sqi=2&v° C. and the second heat zone to about 130° C. to evaporate off the water. The final dried solid loading is about 11.8 mg/cm$^2$. The negative electrode layer was then compressed to a thickness of about 159 µm. The negative made is ready for the dry for the cell assembly.

D) Preparation of Cell for the Evaluation i) Punch the electrodes into the pieces with the electrode tab; ii) Dry the positive electrode at 125° C. for 10 hr and negative electrode at 140° C. for 10 hr; iii) Laminate the positive and negative electrodes with the separator as the middle layer; iv) Put the flat jelly-roll made in the Step iii. into the Aluminium composite bag; v) Dry the bag from Step iv. in a 70° C. vacuum oven; vi) Fill the bag from Step v with the LiPF$_6$ containing organic carbonate based electrolyte; vii) Seal the bag from Step vi; viii) Rest for 16 hours; viiii) Charge the cell to 4.2V at C/50 rate for 8 hours and then to 4.2V at 0.5 C rate for 2 hours, then rest for 20 minutes, then discharge to 2.8V at 0.5 C rate. Under vacuum, puncture the cell to release any gases and then reseal the cell. The cell made here is ready for grading and other tests such as discharging capability test at 50° C., impact test, cycle life test and so on.

FIG. 16 presents the resistance in relation to the temperature increase for the positive electrode collected from autopsying cells with 0, 3.6, and 4.09 V. The resistance increases with the increase in the temperature, especially for the positive electrodes obtained from the cell having the voltages 3.66 and 4V. FIG. 19 shows the discharge capacity at 1, 3, and 6 A current and at 50° C. The cell capacity decreases significantly with the increase of the current, indicating the strong effect from the resistive layer. FIG. 20 lists the cell impedance at 1 kHz and the capacity at 1 A, 3 A, 6 A and 10 A currents and the ratio of the capacity at 3, 6, 10 A over that at 1 A. FIG. 26 presents the over charge profiles during the over charge test. FIG. 28 summarize the cell maximum temperature during the over charge test and residual current in the end of over charge test. FIG. 29 shows the discharge capacity vs. the cycle number. The cell lost about 1% capacity that is about 100% better than that (2.5%) of the baseline cell. FIG. 22 shows the cell temperature profiles during the impact test. FIG. 23 summarizes the cell maximum temperature in the impact test.

Example 3

Preparation of 50% Al$_2$O$_3$ and 50% CaCO$_3$ Based Gas Generator and Resistive Layer, Positive and Negative Electrodes, and the Completed Cell #4 for the Evaluation in the Resistance Measurement, Discharge Capability Tests at 50° C., Impact Test, Over Charge and Cycle Life Tests A) Positive POS4B as an Example of a Gas Generator and Resistive Layer (1$^{st}$ Layer) Preparation.

i) Dissolve Torlon 4000TF (0.8 g) into NMP (10 g); ii) Dissolve PVDF (4.8 g) into NMP (~70 g); iii) Mix solution prepared in Step i and ii, and then add carbon black (0.32 g) and mix for 10 minutes at 6500 rpm; iv) Add nano CaCO$_3$ powder (17.04 g) and Al$_2$O$_3$ powder (17.04 g) to the solution from Step iii and mix for 20 minutes at 6500 rpm to form a flowable slurry; v) Coat this slurry onto 15 □Coat this slurry onto 15 6500 rpm to form a flowable slurry; 6500 rpm; sts at 50 completed Cell #° C. and the second heat zone to about 165° C. to evaporate off the NMP. The final dried solid loading is about 1 mg/cm$^2$.

B) Preparation of POS4 A as an Example of the Positive Electrode Preparation (2$^{nd}$ Layer).

i) Dissolve PVDF (21.6 g) into NMP (250 g); ii) Add carbon black (18 g) and mix for 15 minutes at the rate of about 6500 rpm; iii) Add LiNi$_{1/3}$Co$_{1/3}$Mn$_{1/3}$O$_2$ (NMC) (560.4 g) to the slurry from Step ii and mix for 30 minutes at 6500 rpm to form a flowable slurry; iv) Some NMP may be added for the viscosity adjustment; v) Coat this slurry onto POS4B (Example 3 A) using an automatic coating machine with the first heat zone set to about 85° C. and the second heat zone to about 135° to evaporate off the NMP. The final dried solid loading is about 19.4 mg/cm$^2$. The positive layer was then compressed to a thickness of about 153 p.m. The electrode made here is called as zero voltage against graphite electrode and is ready for the impedance measurement at 0 V in relation to the temperature.

C) Preparation of NEG4 A as an Example of the Negative Electrode Preparation i) Dissolve CMC (13 g) into deionized water (~1000 g); ii) Add carbon black (20 g) and mix for 15 minutes at 6500 rpm; iii) Add negative active graphite (JFE Chemical Corporation; Graphitized Mesophase Carbon Micro Bead (MCMB) and Synthetic Graphite (TIMCAL) (945.92 g in total) to the slurry from Step ii and mix for 30 minutes at 6500 rpm to form a flowable slurry; iv) Add SBR (solid content 50% suspended in water) (42 g) to the slurry formed in Step iii and mix at about 6500 rpm for 5 min; v) Adjust the viscosity for a smooth coating; vi) Coat this slurry onto 9 □m thick Copper foil using an automatic coating machine with the first heat zone set to about 100° C. and the second heat zone to about 130° C. to evaporate off the water. The final dried solid loading is about 11.8 mg/cm². The negative electrode layer was then compressed to a thickness of about 159 μm. The negative made is ready for the dry for the cell assembly.

D) Preparation of Cell for the Evaluation i) Punch the electrodes into the pieces with the electrode tab; ii) Dry the positive electrode at 125° C. for 10 hr and negative electrode at 140° C. for 10 hr; iii) Laminate the positive and negative electrodes with the separator as the middle layer; iv) Put the flat jelly-roll made in the Step iii. into the Aluminium composite bag; v) Dry the bag from Step iv. in a 70° C. vacuum oven; vi) Fill the bag from Step v with the $LiPF_6$ containing organic carbonate based electrolyte; vii) Seal the bag from Step vi; viii) Rest for 16 hours; viiii) Charge the cell to 4.2V at C/50 rate for 8 hours and then to 4.2V at 0.5 C rate for 2 hours, then rest for 20 minutes, then discharge to 2.8V at 0.5 C rate. Under vacuum, puncture the cell to release any gases and then reseal the cell. The cell made here is ready for grading and other tests such as discharging capability test at 50° C., impact test, cycle life test (FIG. 29) and so on.

FIG. 20 lists the cell impedance at 1 kHz and the capacity at 1 A, 3 A, 6 A and 10 A currents and the ratio of the capacity at 3, 6, and 10 A over that at 1 A. FIG. 22 shows the cell temperature profiles during the impact test. FIG. 23 summarizes the cell maximum temperature in the impact test. FIG. 26 shows the voltage profiles of the cell voltage and temperature during the 12V/2 A over charge test. FIG. 28 summarizes the cell maximum cell temperatures in the over charge test.

Example 4

Preparation of $Al_2O_3$ and Sodium Trisilicate ($NaSiO_3$) Mixed Based Gas Generator and Resistive Layer, Positive and Negative Electrodes, and the Completed Cell #5 for the Evaluation in the Resistance Measurement, Discharge Capability Tests at 50° C., Impact Test, Over Charge, and Cycle Life Tests A) Positive POS5B as an Example of a Gas Generator and Resistive Layer ($1^{st}$ Layer) Preparation.

i) Dissolve Torlon 4000TF (0.8 g) into NMP (~10 g); ii) Dissolve PVDF (4.8 g) into NMP (60 g); iii) Mix solution prepared in Step i and ii, and then add carbon black (0.32 g) and mix for 10 minutes at 6500 rpm; iv) Add nano $Al_2O_3$ powder (17.04 g) and $NaSiO_3$ (17.04 g) to the solution from Step iii and mix for 20 minutes at 6500 rpm to form a flowable slurry; v) Coat this slurry onto 15 □Coat this slurry onto 15 6500 rpm to form a flowable slurry; 6500 rpm; sts at 50 and the completed° C. and the second heat zone to about 165° C. to evaporate off the NMP. The final dried solid loading is about 0.7 mg/cm².

B) Preparation of POS5 A as an Example of the Positive Electrode Preparation ($2^{nd}$ Layer).

i) Dissolve PVDF (21.6 g) into NMP (270 g); ii) Add carbon black (18 g) and mix for 15 minutes at the rate of about 6500 rpm; iii) Add $LiNi_{1/3}Co_{1/3}Mn_{1/3}O_2$ (NMC) (560.4 g) to the slurry from Step ii and mix for 30 minutes at the rate of about 6500 rpm to form a flowable slurry; iv) Some NMP may be added for the viscosity adjustment; v) Coat this slurry onto POS5B (Example 4 A) using an automatic coating machine with the first heat zone set to about 85° C. and the second heat zone to about 135° C. to evaporate off the NMP. The final dried solid loading is about 19.4 mg/cm². The positive layer was then compressed to a thickness of about 153 p.m. The electrode made here is called as zero voltage against graphite electrode and is ready for the impedance measurement at 0 V in relation to the temperature.

C) Preparation of NEG5 A as an Example of the Negative Electrode Preparation i) Dissolve CMC (13 g) into deionized water (1000 g); ii) Add carbon black (20 g) and mix for 15 minutes at the rate of about 6500 rpm; iii) Add negative active graphite (JFE Chemical Corporation; Graphitized Mesophase Carbon Micro Bead (MCMB) and Synthetic Graphite (TIMCAL) (945.92 g in total) to the slurry from Step ii and mix for 30 minutes at 6500 rpm to form a flowable slurry; iv) Add SBR (solid content 50% suspended in water) (42 g) to the slurry formed in Step iii and mix at 6500 rpm for 5 min; v) Adjust the viscosity for a smooth coating; vi) Coat this slurry onto 9 □Coat this slurry onto 9 a smooth coating; er) (42 g) to the slurry formed in Step ro Bead (MCMB° C. and the second heat zone to about 130° C. to evaporate off the water. The final dried solid loading is about 11.8 mg/cm². The negative electrode layer was then compressed to a thickness of about 159 p.m. The negative made is ready for the dry for the cell assembly.

D) Preparation of Cell for the Evaluation i) Punch the electrodes into the pieces with the electrode tab; ii) Dry the positive electrode at 125° C. for 10 hr and negative electrode at 140° C. for 10 hr; iii) Laminate the positive and negative electrodes with the separator as the middle layer; iv) Put the flat jelly-roll made in the Step iii. into the Aluminium composite bag; v) Dry the bag from Step iv. in a 70° C. vacuum oven; vi) Fill the bag from Step v with the $LiPF_6$ containing organic carbonate based electrolyte; vii) Seal the bag from Step vi; viii) Rest for 16 hours; viiii) Charge the cell to 4.2V at C/50 rate for 8 hours and then to 4.2V at 0.5 C rate for 2 hours, then rest for 20 minutes, then discharge to 2.8V at 0.5 C rate. Under vacuum, puncture the cell to release any gases and then reseal the cell. The cell made here is ready for grading and other tests such as discharging capability test at 50° C., impact test, cycle life test (FIG. 30) and so on.

FIG. 18 lists the cell impedance at 1 kHz and the capacity at 1 A, 3 A, 6 A and 10 A currents and the ratio of the capacity at 3, 6, and 10 A over that at 1 A. FIG. 22 shows the cell temperature profiles during the impact test FIG. 23 summarizes the cell maximum temperature in the impact test. FIG. 28 summarizes the cell maximum temperature in the 12V/2 A overcharge test.

Example 5

Preparation of 52% $CaCO_3$ and 48% PVDF based gas generator and resistive Layer, Positive and Negative Electrodes, and the Completed Cell #6 for the Evaluation in the Resistance Measurement, Discharge Capability Tests at 50° C., Impact Test, Over Charge, and Cycle Life Tests A) Positive POS6B as an Example of a Gas Generator and Resistive Layer ($1^{st}$ Layer) Preparation.

i) Dissolve PVDF (23.25 g) into NMP (~250 g); ii) Mix solution prepared in Step i, and then add carbon black (1.85 g) and mix for 10 minutes at the rate of about 6500 rpm; iv) Add nano $CaCO_3$ powder (24.9 g) to the solution from Step iii and mix for 20 minutes at 6500 rpm to form a flowable slurry; v) Coat this slurry onto 15 □Coat this slurry onto 15 6500 rpm to form a flowable slurry; the rate of about 6500 rpm; the com° C. and the second heat zone to about 165° C. to evaporate off the NMP. The final dried solid loading is about 1 mg/cm².

B) Preparation of POS6 A as an Example of the Positive Electrode Preparation (2nd Layer).

i) Dissolve PVDF (24 g) into NMP (300 g); ii) Add carbon black (12 g) and mix for 15 minutes at 6500 rpm; iii) Add $LiNi_{0.4}CO_{0.3}Mn_{0.4}CO_{0.3}O_2$ (NMC) (558 g) to the slurry from Step ii and mix for 30 minutes at 6500 rpm to form a flowable slurry; iv) Some NMP may be added for the viscosity adjustment; v) Coat this slurry onto POS6B (Example 5 A) using an automatic coating machine with the first heat zone set to about 85° C. and the second heat zone to about 135° C. to evaporate off the NMP. The final dried solid loading is about 22 mg/cm². The positive layer was then compressed to a thickness of about 167 µm. The electrode made here is called as zero voltage against graphite electrode and is ready for the impedance measurement at 0 V in relation to the temperature.

C) Preparation of NEG6 A as an Example of the Negative Electrode Preparation.

i) Dissolve CMC (9 g) into deionized water (~530 g); ii) Add carbon black (12 g) and mix for 15 minutes at 6500 rpm; iii) Add negative active graphite (JFE Chemical Corporation; Graphitized Mesophase Carbon Micro Bead (MCMB) (564 g) to the slurry from Step ii and mix for 30 minutes at 6500 rpm to form a flowable slurry; iv) Add SBR (solid content 50% suspended in water) (30 g) to the slurry formed in Step iii and mix at about 6500 rpm for 5 min; v) Add some water to adjust the viscosity for a smooth coating; vi) Coat this slurry onto 9 □Add some water to adjust the viscosity for a smooth coating; vi) Coat this slurry onto 9 d (MCM° C. and the second heat zone to about 125° C. to evaporate off the water. The final dried solid loading is about 12 mg/cm². The negative electrode layer was then compressed to a thickness of about 170 µm. The negative made is ready for the dry for the cell assembly.

D) Preparation of Cell for the Evaluation.

i) Punch the electrodes into the pieces with the electrode tab; ii) Dry the positive electrode at 125° C. for 10 hr and negative electrode at 140° C. for 10 hr; iii) Laminate the positive and negative electrodes with the separator as the middle layer; iv) Put the flat jelly-roll made in the Step iii. into the Aluminium composite bag; v) Dry the bag from Step iv. in a 70° C. vacuum oven; vi) Fill the bag from Step v with the $LiPF_6$ containing organic carbonate based electrolyte; vii) Seal the bag from Step vi; viii) Rest for 16 hours; viiii) Charge the cell to 4.2V at C/50 rate for 8 hours and then to 4.2V at 0.5 C rate for 2 hours, then rest for 20 minutes, then discharge to 2.8V at 0.5 C rate. Under vacuum, puncture the cell to release any gases and then reseal the cell. The cell made here is ready for grading and other tests such as discharging capability test at 50° C., impact test, cycle life test and so on.

FIG. 20 lists the cell impedance at 1 kHz and the capacity at 1 A, 3 A, 6 A and 10 A currents and the ratio of the capacity at 3, 6, 10 A over that at 1 A. FIG. 22 shows the cell temperature profiles during the impact test. FIG. 23 summarizes the cell maximum temperature in the impact test. FIG. 28 summarizes the cell maximum cell temperatures in the over charge test.

Example 6

Preparation of positive electrodes for chemical decomposition voltage measurements POS7B: (i) Mix deionized water (~300 g) into Carbopol®-934 (19.64 g); (ii) Add Super-P® (160 mg) and LiOH (200 mg) into the slurry made in Step (i) and mix them for 30 minutes at 5000 rpm; (iii) Add an appropriate amount of deionized water to adjust the slurry to form a coatable slurry. (iv) Coat the slurry onto a 15 µm Aluminum foil with the automatic coating machine with the drying temperatures set to 135° C. for zone 1 and 165° C. for zone 2. The final dried solid loading is about 0.7 mg/cm².

POS8B: (i) Mix deionized water (~100 g) into AI-50 (19.85 g); (ii) Add Super-P® (160 mg) into the slurry made in Step (i) and mixing them for 30 minutes at 5000 rpm; (iii) Add an appropriate amount of deionized water to adjust the slurry to form a coatable slurry. (iv) Coating the slurry onto 15 µm Aluminum foil with automatic coating machine with the drying temperatures set to 135 for zone 1 and 165° C. for zone 2. The final dried solid loading is about 0.7 mg/cm².

POS9B: (i) Mix deionized water (~322 g) into 19.85 g CMC-DN-800H; (ii) Add Super-P® (160 mg) into the slurry made in Step (i) and mixing them for 30 minutes at 5000 rpm; (iii) Add an appropriate amount of deionized water to adjust the slurry to form a coatable slurry. (iv) Coating the slurry onto 15 µm Aluminum foil with automatic coating machine with the drying temperatures set to 135 for zone 1 and 165° C. for zone 2. The final dried solid loading is about 0.7 mg/cm².

POS13B: (i) Dissolve Torlon 4000TF (400 mg) into NMP (4 g). (ii) Dissolve PVDF-A (2.4 g) into NMP (30 g). (iii) Mix above two solution and add Super-P® (160 mg), then mix them for 30 minutes at 5000 rpm. (iv) Add $La_2(CO_3)_3$ (17.04 g) or the salts listed in FIG. 14 into above slurry and mix them together at 5000 rpm for 30 min. (v) coat the slurry onto 15 µm Aluminum foil with automatic coating machine at first heat zone set to 130° C. and second heat zone to 160° C. for evaporate off the NMP. Final dried solid loading is about 0.7 mg/cm².

Example 7

Electrochemical Test for the Gas Generator Layers on the Aluminum Foil

The decomposition voltages of all resistive layers were measured with three electrodes configuration (resistive layer as the working electrode, and lithium metal as both reference electrode and count electrode) by Linear Sweep Voltammetry technology using VMP2 multichannel potentiostat instrument at the room temperature. A 0.3 cm×2.0 cm piece of the resistive layer as the working electrode, and 0.3 cm×2.0 cm piece of lithium metal as both reference electrode and count electrode were put into a glass containing LiPF6 ethylene carbonate based electrolyte (5 g). The scan rate is 5 mV/second in the voltage range from 0 to 6V. FIGS. 31 and 33 shows the decomposition voltage profiles of these compounds. FIGS. 32 and 34 summarizes the peak current and peak voltage for each of the compounds tested.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. An improved high energy density rechargeable battery, comprising:
    a first electrode;
    a first current collector for transferring electrons;
    a current interrupter interposed between the first electrode and the first current collector, wherein the current interrupter comprises a heat sensitive material configured to cause, upon activation of at least a temperature trigger, a formation of a nonconductive gap between the first electrode and the first current collector, wherein the forming of the nonconductive gap electrically decouples the first electrode from the first current collector and diverts current flow from the first current collector, wherein the heat sensitive material is configured to transition the current interrupter from an engaged configuration to an unengaged configuration upon activation of at least the temperature trigger, wherein the first electrode and the first current collector are electrically coupled when the current interrupter is in the engaged configuration, and wherein the nonconductive gap is formed between the first electrode and the first current collector when the current interrupter is in the unengaged configuration;

a second electrode having an opposite polarity of the first electrode; and a separator interposed between the first electrode and the second electrode.

2. The battery of claim 1, further comprising a current limiter.

3. The battery of claim 2, further comprising a second current collector.

4. The battery of claim 3, wherein the current limiter is interposed between the second electrode and the second current collector.

5. The battery of claim 2, wherein the current limiter is interposed between the first electrode and the first current collector.

6. The battery of claim 5, wherein the current limiter and the current interrupter are simultaneously incorporated into a single protective layer interposed by lamination between the first electrode and the first current collector.

7. The battery of claim 2, wherein a resistivity of the current limiter is greater than the internal resistivity of the first electrode at temperatures above a temperature range for standard operation.

8. The battery of claim 2, wherein the resistivity of the current limiter does not transition at temperatures within the temperature range for standard operation.

9. The battery of claim 2, wherein the resistivity of the current limiter is less than the internal resistivity of the first electrode at temperatures within a temperature range for standard operation.

10. The battery of claim 1, wherein the temperature trigger is activated when temperature exceeds a temperature range for standard operation.

11. The battery of claim 1, wherein the heat sensitive material is further configured to cause the formation of the nonconductive gap upon activation of a voltage trigger, and wherein the voltage trigger is activated when voltage exceeds a voltage range for standard operation.

12. The battery of claim 1, wherein the first electrode and the first current collector are electrically coupled via a laminated connection provided by the current interrupter when the current interrupter is in the engaged configuration, and wherein the forming of the nonconductive gap delaminates the laminated connection between the first electrode and the first current collector.

13. A method, comprising:

forming a nonconductive gap between an electrode within a battery and a current collector, wherein the forming of the nonconductive gap is caused by a heat sensitive material in response to an activation of least a temperature trigger, wherein the heat sensitive material comprises a current interrupter interposed between the electrode and current collector, wherein the forming of the nonconductive gap electrically decouples the electrode from the current collector and diverts current flow from the current collector, wherein the heat sensitive material is configured to transition the current interrupter from an engaged configuration to an unengaged configuration upon activation of at least the temperature trigger, wherein the electrode and the current collector are electrically coupled when the current interrupter is in the engaged configuration, and wherein the nonconductive gap is formed between the electrode and the current collector when the current interrupter is in the unengaged configuration.

14. The battery of claim 1, wherein the heat sensitive material forms the nonconductive gap by at least generating, upon activation of at least the temperature trigger, a gas.

15. The battery of claim 1, wherein the heat sensitive material forms the nonconductive gap by at least generating, upon activation of at least the temperature trigger, a liquid.

16. The battery of claim 15, wherein the liquid generates a gas through vaporization.

17. The battery of claim 15, wherein the liquid generates a gas by reacting with the first electrode, the first current collector, the separator, and/or an electrolyte comprising the battery.

* * * * *